United States Patent
Ye et al.

(10) Patent No.: US 9,389,393 B2
(45) Date of Patent: Jul. 12, 2016

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Long Ye, Fujian (CN); Kai-Lun Wang, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 131 days.

(21) Appl. No.: 14/340,626

(22) Filed: Jul. 25, 2014

(65) Prior Publication Data

US 2015/0253537 A1 Sep. 10, 2015

(30) Foreign Application Priority Data

Mar. 10, 2014 (CN) .......................... 2014 1 0084670

(51) Int. Cl.
  *G02B 13/18* (2006.01)
  *G02B 9/60* (2006.01)
  *G02B 13/00* (2006.01)

(52) U.S. Cl.
  CPC .............. *G02B 9/60* (2013.01); *G02B 13/0045* (2013.01)

(58) Field of Classification Search
  CPC .............................. G02B 9/60; G02B 13/0045
  See application file for complete search history.

(56) References Cited

U.S. PATENT DOCUMENTS

| 8,456,758 | B1 | 6/2013 | Huang et al. |
| 8,482,863 | B2 | 7/2013 | Tsai et al. |
| 8,514,501 | B2 | 8/2013 | Chen et al. |
| 8,520,124 | B2 | 8/2013 | Ozaki |
| 8,531,786 | B2 | 9/2013 | Tsai et al. |
| 2011/0316969 | A1 | 12/2011 | Hsieh et al. |
| 2012/0127359 | A1 | 5/2012 | Chen et al. |
| 2013/0050847 | A1* | 2/2013 | Hsu .......................... G02B 9/60 359/714 |
| 2013/0107376 | A1 | 5/2013 | Tsai et al. |
| 2013/0265650 | A1 | 10/2013 | Chen et al. |

FOREIGN PATENT DOCUMENTS

| JP | 2013011710 | 1/2013 |
| TW | 201239444 | 10/2012 |
| TW | 201245758 | 11/2012 |
| TW | 201329498 | 7/2013 |
| TW | 201331619 | 8/2013 |
| TW | 201348736 | 12/2013 |
| TW | 201400852 | 1/2014 |
| TW | 201400853 | 1/2014 |
| TW | 201403121 | 1/2014 |
| TW | 201409070 | 3/2014 |
| WO | 2010113717 | 10/2010 |

OTHER PUBLICATIONS

"Search Report of Taiwan Related Application No. 103112552," issued on Jun. 4, 2015, with English translation thereof, p. 1-p. 2.

* cited by examiner

*Primary Examiner* — Joseph P Martinez

(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant lens parameters, a short system length of the imaging lens may be achieved while maintaining good optical performance.

17 Claims, 45 Drawing Sheets

| system focal length=2.629mm, half field-of-view=40.525°, F-number=2.05, system length=3.923mm | | | | | | |
|---|---|---|---|---|---|---|
| lens element | surface | radius of curvature | thickness | refractive index | Abbe number | material | focal length |
| object | | ∞ | 300.000 | | | | |
| aperture stop 2 | | ∞ | -0.070 | | | | |
| first lens element 3 | object-side surface 31 | 1.889 | 0.503 | 1.544 | 56.114 | plastic | 4.129 |
| | image-side surface 32 | 10.546 | 0.099 | | | | |
| second lens element 4 | object-side surface 41 | 4.202 | 0.185 | 1.640 | 23.529 | plastic | -3.306 |
| | image-side surface 42 | 1.389 | 0.058 | | | | |
| third lens element 5 | object-side surface 51 | 1.343 | 0.501 | 1.544 | 56.114 | plastic | 3.316 |
| | image-side surface 52 | 4.518 | 0.250 | | | | |
| fourth lens element 6 | object-side surface 61 | -1.762 | 0.584 | 1.544 | 56.114 | plastic | 2.567 |
| | image-side surface 62 | -0.872 | 0.062 | | | | |
| fifth lens element 7 | object-side surface 71 | 1.524 | 0.544 | 1.544 | 56.114 | plastic | -3.485 |
| | image-side surface 72 | 0.739 | 0.794 | | | | |
| optical filter 8 | object-side surface 81 | ∞ | 0.210 | 1.517 | 64.167 | | |
| | image-side surface 82 | ∞ | 0.133 | | | | |
| image plane 100 | | | | | | | |

FIG.3

| surface | K | a2 | a4 | a6 | a8 | a10 | a12 | a14 | a16 |
|---|---|---|---|---|---|---|---|---|---|
| 31 | -1.25058 | 0 | 0.040899 | -0.58445 | 2.557390538 | -5.14034 | -0.48941 | 14.29399 | -13.5754 |
| 32 | 0 | 0 | -0.37119 | 0.85517 | -2.138640541 | 0.970508 | -0.81542 | 6.948682 | -6.83352 |
| 41 | -349.512 | 0 | -0.38034 | 1.120037 | -2.349689953 | 1.049444 | -3.97747 | 14.43568 | -11.2698 |
| 42 | -29.6166 | 0 | -0.16489 | 1.10638 | -3.110510293 | 4.808755 | -5.64521 | 4.436766 | -1.59691 |
| 51 | -20.6658 | 0 | 0.079885 | -0.1889 | 0.027328218 | 0.286475 | -0.288 | -0.41254 | 0.410326 |
| 52 | 0 | 0 | 0.091789 | -0.12438 | -0.094891701 | 0.060613 | 0.294881 | -0.52805 | 0.247805 |
| 61 | -13.1536 | 0 | 0.024669 | 0.134392 | 0.0202073 | -0.17969 | -0.02161 | 0.112944 | -0.04935 |
| 62 | -1.26315 | 0 | 0.127454 | -0.11632 | 0.124441977 | 0.051765 | -0.00103 | -0.07872 | 0.030569 |
| 71 | -5.24452 | 0 | -0.2133 | 0.135759 | -0.056769222 | 0.010211 | 0.00291 | -0.00173 | 0.000212 |
| 72 | -3.73724 | 0 | -0.14705 | 0.103923 | -0.057000147 | 0.020497 | -0.00464 | 0.0006 | -3.5E-05 |

FIG.4

| system focal length=2.69mm , half field-of-view=39.812°, F-number=2.05, system length=3.900mm |||||||
|---|---|---|---|---|---|---|
| lens element | surface | radius of curvature | thickness | refractive index | Abbe number | material | focal length |
| object | | ∞ | 300.000 | | | | |
| aperture stop 2 | | ∞ | -0.070 | | | | |
| first lens element 3 | object-side surface 31 | 1.889 | 0.464 | 1.544 | 56.114 | plastic | 4.136 |
| | image-side surface 32 | 10.546 | 0.082 | | | | |
| second lens element 4 | object-side surface 41 | 4.202 | 0.250 | 1.640 | 23.529 | plastic | -3.337 |
| | image-side surface 42 | 1.389 | 0.060 | | | | |
| third lens element 5 | object-side surface 51 | 1.343 | 0.480 | 1.544 | 56.114 | plastic | 3.323 |
| | image-side surface 52 | 4.518 | 0.320 | | | | |
| fourth lens element 6 | object-side surface 61 | -1.762 | 0.515 | 1.544 | 56.114 | plastic | 2.626 |
| | image-side surface 62 | -0.872 | 0.060 | | | | |
| fifth lens element 7 | object-side surface 71 | 1.524 | 0.519 | 1.544 | 56.114 | plastic | -3.435 |
| | image-side surface 72 | 0.739 | 0.721 | | | | |
| optical filter 8 | object-side surface 81 | ∞ | 0.210 | 1.517 | 64.167 | | |
| | image-side surface 82 | ∞ | 0.219 | | | | |
| image plane 100 | | ∞ | | | | | |

FIG.7

| surface | K | a2 | a4 | a6 | a8 | a10 | a12 | a14 | a16 |
|---|---|---|---|---|---|---|---|---|---|
| 31 | -1.25058 | 0 | -0.03034 | -0.11947 | 1.283637929 | -3.36051 | -1.61979 | 13.50099 | -11.8897 |
| 32 | 0 | 0 | -0.42081 | 1.105302 | -2.702502485 | 1.550886 | -0.81361 | 5.871113 | -5.64566 |
| 41 | -349.512 | 0 | -0.38844 | 1.006989 | -1.983628795 | 1.079133 | -4.61253 | 14.38828 | -10.7308 |
| 42 | -29.6166 | 0 | -0.25006 | 1.052578 | -2.780660231 | 4.611719 | -5.79351 | 4.510678 | -1.55813 |
| 51 | -20.6658 | 0 | 0.014534 | -0.16266 | 0.063888588 | 0.370318 | -0.54374 | -0.25004 | 0.368378 |
| 52 | 0 | 0 | 0.053966 | -0.10761 | -0.085862436 | 0.060272 | 0.281555 | -0.52483 | 0.235126 |
| 61 | -13.1536 | 0 | -0.02487 | 0.057287 | 0.131617081 | -0.16758 | -0.03191 | 0.092068 | -0.05758 |
| 62 | -1.26315 | 0 | 0.126925 | -0.1075 | 0.114194212 | 0.050356 | 0.006517 | -0.06915 | 0.024754 |
| 71 | -5.24452 | 0 | -0.22674 | 0.142245 | -0.055607266 | 0.006611 | 0.003435 | -0.00128 | 0.000127 |
| 72 | -3.73724 | 0 | -0.15683 | 0.109043 | -0.057551848 | 0.019919 | -0.00448 | 0.000578 | -3.3E-05 |

FIG.8 system focal length=2.58mm, half field-of-view=40.956°, F-number=2.08, system length=3.762mm

| lens element | surface | radius of curvature | thickness | refractive index | Abbe number | material | focal length |
|---|---|---|---|---|---|---|---|
| object | | ∞ | 300 | | | | |
| aperture stop 2 | | ∞ | -0.04 | | | | |
| first lens element 3 | object-side surface 31 | 2.354164 | 0.547478 | 1.544102 | 56.11429 | plastic | 2.67836189 |
| | image-side surface 32 | -3.54269 | 0.052812 | | | | |
| second lens element 4 | object-side surface 41 | 10.30026 | 0.245279 | 1.64283 | 22.43732 | plastic | -3.320506592 |
| | image-side surface 42 | 1.763034 | 0.116785 | | | | |
| third lens element 5 | object-side surface 51 | 2.263493 | 0.386147 | 1.535049 | 55.71236 | plastic | 9.151226308 |
| | image-side surface 52 | 3.94754 | 0.233376 | | | | |
| fourth lens element 6 | object-side surface 61 | -2.02732 | 0.443596 | 1.535049 | 55.71236 | plastic | 2.241377813 |
| | image-side surface 62 | -0.81277 | 0.140869 | | | | |
| fifth lens element 7 | object-side surface 71 | 1.841702 | 0.532362 | 1.53113 | 55.74414 | plastic | -2.836829191 |
| | image-side surface 72 | 0.746792 | 0.45 | | | | |
| optical filter 8 | object-side surface 81 | ∞ | 0.21 | 1.5168 | 64.16734 | | |
| | image-side surface 82 | ∞ | 0.404008 | | | | |
| image plane 100 | | ∞ | | | | | |

FIG.11

| surface | K | a2 | a4 | a6 | a8 | a10 | a12 | a14 | a16 |
|---|---|---|---|---|---|---|---|---|---|
| 31 | -3.17505 | 0 | 0.00226 | -0.31595 | 0.732798069 | -1.07963 | -0.67965 | 1.201637 | 0.157491 |
| 32 | -86.2261 | 0 | -0.27606 | 0.007152 | -0.127723495 | -0.52368 | 0.840233 | 0.857337 | -1.48393 |
| 41 | -1355.27 | 0 | -0.01442 | -0.41123 | 0.251612899 | -0.32408 | -0.36847 | 3.177447 | -2.75106 |
| 42 | -18.9892 | 0 | 0.034033 | 0.086587 | -0.576003326 | 0.482014 | 0.070262 | -0.16463 | 0 |
| 51 | -14.6398 | 0 | -0.21619 | 0.10033 | 0.048772531 | -0.02667 | -0.12268 | 0.238046 | -0.10929 |
| 52 | 0 | 0 | -0.0292 | -0.11185 | -0.064833072 | 0.016383 | 0.053282 | 0 | 0 |
| 61 | -5.45126 | 0 | 0.23683 | -0.04334 | -0.167769394 | 0.010656 | 0.082158 | 0.00048 | -0.02985 |
| 62 | -0.86849 | 0 | 0.35994 | -0.33906 | 0.283471824 | 0.021214 | -0.0559 | -0.03297 | 0.02329 |
| 71 | -3.7515 | 0 | -0.2453 | 0.05317 | 0.002244968 | -0.00436 | 0.000105 | 0.000493 | -5.4E-05 |
| 72 | -4.32756 | 0 | -0.11412 | 0.045991 | -0.014030475 | 0.001605 | 0.000218 | -7.9E-05 | 4.97E-06 |

FIG.12

FIG.15 system focal length=2.68mm, half field-of-view=40.010°, F-number=2.053, system length=4.009mm

| lens element | surface | radius of curvature | thickness | refractive index | Abbe number | material | focal length |
|---|---|---|---|---|---|---|---|
| object | | ∞ | 300.000 | | | | |
| aperture stop 2 | | ∞ | -0.070 | | | | |
| first lens element 3 | object-side surface 31 | 1.801 | 0.491 | 1.544 | 56.114 | plastic | 4.499 |
| | image-side surface 32 | 6.108 | 0.185 | | | | |
| second lens element 4 | object-side surface 41 | 6.548 | 0.250 | 1.640 | 23.529 | plastic | -3.821 |
| | image-side surface 42 | 1.763 | 0.060 | | | | |
| third lens element 5 | object-side surface 51 | 1.640 | 0.379 | 1.544 | 56.114 | plastic | 4.183 |
| | image-side surface 52 | 5.341 | 0.424 | | | | |
| fourth lens element 6 | object-side surface 61 | -5.124 | 0.607 | 1.544 | 56.114 | plastic | 1.881 |
| | image-side surface 62 | -0.891 | 0.060 | | | | |
| fifth lens element 7 | object-side surface 71 | 1.946 | 0.500 | 1.544 | 56.114 | plastic | -2.168 |
| | image-side surface 72 | 0.669 | 0.500 | | | | |
| optical filter 8 | object-side surface 81 | ∞ | 0.210 | 1.517 | 64.167 | | |
| | image-side surface 82 | ∞ | 0.343 | | | | |
| image plane 100 | | | | | | | |

| surface | K | a2 | a4 | a6 | a8 | a10 | a12 | a14 | a16 |
|---|---|---|---|---|---|---|---|---|---|
| 31 | -10.4832 | 0 | 0.229369 | -0.57025 | 1.921687127 | -3.94644 | 0.391085 | 10.34139 | -11.0427 |
| 32 | 0 | 0 | -0.15262 | 0.078566 | -0.767023092 | 1.480739 | -3.07255 | 4.507832 | -2.98056 |
| 41 | -661.697 | 0 | -0.1754 | -0.13388 | -0.498195182 | 2.383227 | -7.09838 | 9.931285 | -5.09357 |
| 42 | -34.603 | 0 | -0.1373 | 0.721096 | -2.596128466 | 5.0985 | -6.01518 | 3.882985 | -1.06408 |
| 51 | -29.0211 | 0 | 0.007721 | 0.16909 | -0.408497282 | 0.324807 | 0.008017 | -0.25193 | 0.113337 |
| 52 | 0 | 0 | -0.13144 | 0.192621 | -0.206517339 | -0.07694 | 0.399337 | -0.408 | 0.142598 |
| 61 | -104.133 | 0 | -0.05959 | -0.0853 | 0.190177605 | -0.062 | -0.07207 | 0.056184 | -0.01185 |
| 62 | -1.07239 | 0 | 0.168961 | -0.16318 | 0.062283841 | 0.046038 | 0.037984 | -0.06028 | 0.015727 |
| 71 | -17.6038 | 0 | -0.20655 | 0.143446 | -0.0048722264 | 0.004375 | 0.002714 | -0.0009 | 8.04E-05 |
| 72 | -3.7244 | 0 | -0.14814 | 0.109327 | -0.0573319445 | 0.019911 | -0.0044 | 0.000549 | -2.9E-05 |

FIG.16 system focal length=2.68mm, half field-of-view=40.127°, F-number=2.060, system length=4.006mm

| lens element | surface | radius of curvature | thickness | refractive index | Abbe number | material | focal length |
|---|---|---|---|---|---|---|---|
| object | | ∞ | 300 | | | | |
| aperture stop 2 | | ∞ | -0.07 | | | | |
| first lens element 3 | object-side surface 31 | 1.895994 | 0.495112 | 1.544102 | 56.11429 | plastic | 3.577782824 |
| | image-side surface 32 | 58.70699 | 0.24685 | | | | |
| second lens element 4 | object-side surface 41 | 13.20494 | 0.336451 | 1.639729 | 23.5288 | plastic | -5.589786083 |
| | image-side surface 42 | 2.802437 | 0.179236 | | | | |
| third lens element 5 | object-side surface 51 | 8.587496 | 0.406015 | 1.544102 | 56.11429 | plastic | -73.39711792 |
| | image-side surface 52 | 6.953839 | 0.084332 | | | | |
| fourth lens element 6 | object-side surface 61 | -10.0033 | 0.549549 | 1.544102 | 56.11429 | plastic | 1.877386761 |
| | image-side surface 62 | -0.94772 | 0.269126 | | | | |
| fifth lens element 7 | object-side surface 71 | 1.539853 | 0.40364 | 1.544102 | 56.11429 | plastic | -2.615446817 |
| | image-side surface 72 | 0.672295 | 0.5 | | | | |
| optical filter 8 | object-side surface 81 | ∞ | 0.21 | 1.5168 | 64.16734 | | |
| | image-side surface 82 | ∞ | 0.326166 | | | | |
| image plane 100 | | ∞ | | | | | |

FIG.19

| surface | K | a2 | a4 | a6 | a8 | a10 | a12 | a14 | a16 |
|---|---|---|---|---|---|---|---|---|---|
| 31 | -11.9886 | 0 | 0.20331 | -0.61255 | 1.904194181 | -3.94731 | 0.302915 | 10.19167 | -10.9201 |
| 32 | 0 | 0 | -0.18209 | 0.001802 | -0.610154654 | 1.531004 | -3.21885 | 4.32252 | -2.55642 |
| 41 | -1351.52 | 0 | -0.26575 | -0.15533 | -0.443237806 | 2.527122 | -6.91436 | 10.1432 | -5.40903 |
| 42 | -7.62562 | 0 | -0.23981 | 0.740749 | -2.544415845 | 5.113501 | -6.03151 | 3.871308 | -1.03366 |
| 51 | -1654.73 | 0 | -0.0933 | 0.245435 | -0.387800764 | 0.301697 | -0.01252 | -0.2566 | 0.147652 |
| 52 | 0 | 0 | -0.2553 | 0.230262 | -0.208765452 | -0.07866 | 0.407405 | -0.40311 | 0.133982 |
| 61 | -562.641 | 0 | -0.05248 | -0.11516 | 0.18564948 | -0.05211 | -0.06883 | 0.055877 | -0.01149 |
| 62 | -0.9888 | 0 | 0.165125 | -0.12999 | 0.067185168 | 0.040205 | 0.034374 | -0.06066 | 0.016919 |
| 71 | -5.88213 | 0 | -0.2488 | 0.135674 | -0.044116983 | 0.005138 | 0.002467 | -0.00095 | 9.23E-05 |
| 72 | -3.11821 | 0 | -0.16587 | 0.113374 | -0.057380422 | 0.019678 | -0.00441 | 0.000569 | -3.2E-05 |

FIG.20

FIG.23 system focal length=2.679mm, half field-of-view=40.020°, F-number=2.057, system length=4.104mm

| lens element | surface | radius of curvature | thickness | refractive index | Abbe number | material | focal length |
|---|---|---|---|---|---|---|---|
| object | | ∞ | 300 | | | | |
| aperture stop 2 | | ∞ | -0.07 | | | | |
| first lens element 3 | object-side surface 31 | 1.938581 | 0.503703 | 1.544102 | 56.11429 | plastic | 4.034131934 |
| | image-side surface 32 | 14.69862 | 0.253643 | | | | |
| second lens element 4 | object-side surface 41 | 3.917804 | 0.293415 | 1.639729 | 23.5288 | plastic | -6.108296591 |
| | image-side surface 42 | 1.906124 | 0.137075 | | | | |
| third lens element 5 | object-side surface 51 | 3.762226 | 0.349982 | 1.544102 | 56.11429 | plastic | 172.9615823 |
| | image-side surface 52 | 3.78962 | 0.101192 | | | | |
| fourth lens element 6 | object-side surface 61 | -7.59232 | 0.718458 | 1.544102 | 56.11429 | plastic | 1.89412257 |
| | image-side surface 62 | -0.94053 | 0.180055 | | | | |
| fifth lens element 7 | object-side surface 71 | 1.836705 | 0.539726 | 1.544102 | 56.11429 | plastic | -2.728533703 |
| | image-side surface 72 | 0.73717 | 0.5 | | | | |
| optical filter 8 | object-side surface 81 | ∞ | 0.21 | 1.5168 | 64.16734 | | |
| | image-side surface 82 | ∞ | 0.3173 | | | | |
| image plane 100 | | | | | | | |

| surface | K | a2 | a4 | a6 | a8 | a10 | a12 | a14 | a16 |
|---|---|---|---|---|---|---|---|---|---|
| 31 | -18.8166 | 0 | 0.296071 | -0.81275 | 1.994342669 | -3.26612 | -0.28261 | 8.338216 | -8.20317 |
| 32 | 0 | 0 | -0.19568 | 0.076446 | -0.740323981 | 1.728444 | -3.10985 | 3.595808 | -1.88009 |
| 41 | -53.9583 | 0 | -0.25581 | -0.22865 | -0.457845674 | 2.626519 | -7.31555 | 10.50518 | -5.37222 |
| 42 | -3.20424 | 0 | -0.30988 | 0.762212 | -2.470947691 | 5.05094 | -6.08137 | 3.87953 | -1.00073 |
| 51 | -120.514 | 0 | -0.16151 | 0.392708 | -0.430170806 | 0.285614 | 0.003813 | -0.25001 | 0.129937 |
| 52 | 0 | 0 | -0.27535 | 0.263757 | -0.190496140 | -0.06149 | 0.411635 | -0.40645 | 0.1218 |
| 61 | -324.866 | 0 | 0.027929 | -0.12446 | 0.213829459 | -0.06235 | -0.07201 | 0.052003 | -0.01106 |
| 62 | -0.91916 | 0 | 0.155679 | -0.08326 | 0.043187808 | 0.035957 | 0.041048 | -0.05908 | 0.015286 |
| 71 | -6.13294 | 0 | -0.21775 | 0.126463 | -0.044526945 | 0.005508 | 0.002438 | -0.00094 | 8.93E-05 |
| 72 | -3.37249 | 0 | -0.14813 | 0.107482 | -0.057145895 | 0.0201 | -0.00446 | 0.000554 | -2.9E-05 |

FIG. 24 system focal length=2.679mm, half field-of-view=40.015°, F-number=2.058, system length=4.084mm

| lens element | surface | radius of curvature | thickness | refractive index | Abbe number | material | focal length |
|---|---|---|---|---|---|---|---|
| object | | ∞ | 300 | | | | |
| aperture stop 2 | | ∞ | -0.07 | | | | |
| first lens element 3 | object-side surface 31 | 1.844442 | 0.452707 | 1.544102 | 56.11429 | plastic | 4.155409072 |
| | image-side surface 32 | 9.00974 | 0.262428 | | | | |
| second lens element 4 | object-side surface 41 | 3.43802 | 0.293387 | 1.639729 | 23.5288 | plastic | -6.274958685 |
| | image-side surface 42 | 1.796234 | 0.134422 | | | | |
| third lens element 5 | object-side surface 51 | 3.55239 | 0.349965 | 1.544102 | 56.11429 | plastic | 46.33848546 |
| | image-side surface 52 | 3.988932 | 0.099213 | | | | |
| fourth lens element 6 | object-side surface 61 | -10.8378 | 0.792705 | 1.544102 | 56.11429 | plastic | 1.884508521 |
| | image-side surface 62 | -0.9639 | 0.175865 | | | | |
| fifth lens element 7 | object-side surface 71 | 1.676222 | 0.495673 | 1.544102 | 56.11429 | plastic | -2.60305329 |
| | image-side surface 72 | 0.688767 | 0.5 | | | | |
| optical filter 8 | object-side surface 81 | ∞ | 0.21 | 1.5168 | 64.16734 | | |
| | image-side surface 82 | ∞ | 0.318169 | | | | |
| image plane 100 | | ∞ | | | | | |

FIG.27

| surface | K | a2 | a4 | a6 | a8 | a10 | a12 | a14 | a16 |
|---|---|---|---|---|---|---|---|---|---|
| 31 | -20.1902 | 0 | 0.366366 | -0.96664 | 2.062115995 | -2.69918 | -1.14854 | 7.574081 | -6.62922 |
| 32 | 0 | 0 | -0.18414 | 0.112291 | -0.885513921 | 1.94088 | -3.16394 | 3.169121 | -1.49872 |
| 41 | -77.2577 | 0 | -0.12865 | -0.57302 | 0.18263389 | 2.342766 | -8.42281 | 12.11465 | -5.96758 |
| 42 | -2.02148 | 0 | -0.32047 | 0.766392 | -2.464947541 | 4.999715 | -6.00238 | 3.848877 | -1.00707 |
| 51 | -86.8889 | 0 | -0.15085 | 0.444741 | -0.530942037 | 0.311975 | 0.044958 | -0.25176 | 0.113181 |
| 52 | 0 | 0 | -0.28603 | 0.278937 | -0.176408546 | -0.06967 | 0.402139 | -0.40309 | 0.124473 |
| 61 | -651.217 | 0 | 0.005061 | -0.1213 | 0.228587821 | -0.06853 | -0.07395 | 0.049743 | -0.00829 |
| 62 | -0.88202 | 0 | 0.142074 | -0.03365 | -0.014664378 | 0.03859 | 0.052137 | -0.05658 | 0.013103 |
| 71 | -10.4995 | 0 | -0.19358 | 0.102097 | -0.032695325 | 0.003474 | 0.002178 | -0.00081 | 7.77E-05 |
| 72 | -3.38428 | 0 | -0.15578 | 0.11269 | -0.059062755 | 0.020448 | -0.00448 | 0.000553 | -2.9E-05 |

FIG.28

| system focal length=2.682mm , half field-of-view=40.002° , F-number=2.078, system length=3.753mm | | | | | | |
|---|---|---|---|---|---|---|
| lens element | surface | radius of curvature | thickness | refractive index | Abbe number | material | focal length |
| object | | ∞ | 300 | | | | |
| aperture stop 2 | | ∞ | -0.04 | | | | |
| first lens element 3 | object-side surface 31 | 1.848408 | 0.680352 | 1.544102 | 56.11429 | plastic | 2.39837987 |
| | image-side surface 32 | -3.90637 | 0.061049 | | | | |
| second lens element 4 | object-side surface 41 | -3.32032 | 0.171647 | 1.639729 | 23.5288 | plastic | -5.890088364 |
| | image-side surface 42 | -27.0005 | 0.10814 | | | | |
| third lens element 5 | object-side surface 51 | -32.5459 | 0.306378 | 1.535049 | 55.71236 | plastic | -55.94642953 |
| | image-side surface 52 | 390.0725 | 0.215676 | | | | |
| fourth lens element 6 | object-side surface 61 | -3.00214 | 0.480995 | 1.535049 | 55.71236 | plastic | 1.946076903 |
| | image-side surface 62 | -0.81835 | 0.201907 | | | | |
| fifth lens element 7 | object-side surface 71 | -32.7009 | 0.593205 | 1.53113 | 55.74414 | plastic | -1.745113281 |
| | image-side surface 72 | 0.963163 | 0.45 | | | | |
| optical filter 8 | object-side surface 81 | ∞ | 0.21 | 1.5168 | 64.16734 | | |
| | image-side surface 82 | ∞ | 0.273923 | | | | |
| image plane 100 | | ∞ | | | | | |

FIG.31

| surface | K | a2 | a4 | a6 | a8 | a10 | a12 | a14 | a16 |
|---|---|---|---|---|---|---|---|---|---|
| 31 | -1.39596 | 0 | 0.000894 | -0.13954 | 0.355489006 | -0.73099 | 0.267157 | -0.03249 | -0.52444 |
| 32 | -65.1006 | 0 | -0.32712 | -0.10877 | -0.0302481 | -0.20642 | 0.591957 | 0.163909 | -0.70431 |
| 41 | 0 | 0 | -0.07083 | -0.49769 | 0.274616531 | -0.37645 | -0.29937 | 3.536317 | -3.08895 |
| 42 | -12794 | 0 | 0.030337 | 0.081761 | -0.59164929 | 0.493214 | 0.075357 | -0.17809 | 0 |
| 51 | 1025.057 | 0 | -0.12572 | 0.076534 | 0.033410441 | -0.0581 | -0.15418 | 0.247255 | -0.07232 |
| 52 | 0 | 0 | -0.05649 | -0.16238 | -0.075569995 | 0.02709 | 0.091529 | -0.01927 | 0 |
| 61 | 0.750243 | 0 | 0.139217 | -0.07956 | -0.125985408 | 0.013393 | 0.006246 | 0.006716 | -0.01376 |
| 62 | -0.90334 | 0 | 0.351153 | -0.30356 | 0.282129223 | 0.00765 | -0.07258 | -0.02736 | 0.028627 |
| 71 | 0 | 0 | -0.17342 | 0.0404 | -0.0020170017 | 0.00326 | 0.002812 | -0.00256 | -0.00083 |
| 72 | -5.93343 | 0 | -0.10542 | 0.049708 | -0.015088969 | 0.00153 | 0.000245 | -7.3E-05 | 2.36E-06 |

| lens element | surface | radius of curvature | thickness | refractive index | Abbe number | material | focal length |
|---|---|---|---|---|---|---|---|
| system focal length=2.608mm, half field-of-view=40.701°, F-number=2.052, system length=3.927mm ||||||||
| object | | ∞ | 300 | | | | |
| aperture stop 2 | | ∞ | -0.07 | | | | |
| first lens element 3 | object-side surface 31 | 1.912032 | 0.414926 | 1.544102 | 56.11429 | plastic | 4.164508346 |
| | image-side surface 32 | 11.10237 | 0.113429 | | | | |
| second lens element 4 | object-side surface 41 | 4.835161 | 0.249982 | 1.639729 | 23.5288 | plastic | -3.336371294 |
| | image-side surface 42 | 1.458352 | 0.079092 | | | | |
| third lens element 5 | object-side surface 51 | 1.361934 | 0.592462 | 1.544102 | 56.11429 | plastic | 3.373229912 |
| | image-side surface 52 | 4.425737 | 0.199393 | | | | |
| fourth lens element 6 | object-side surface 61 | -1.8499 | 0.570405 | 1.544102 | 56.11429 | plastic | 2.4856497 |
| | image-side surface 62 | -0.86803 | 0.060017 | | | | |
| fifth lens element 7 | object-side surface 71 | 1.447669 | 0.508856 | 1.544102 | 56.11429 | plastic | -3.474086309 |
| | image-side surface 72 | 0.719098 | 0.733729 | | | | |
| optical filter 8 | object-side surface 81 | ∞ | 0.21 | 1.5168 | 64.16734 | | |
| | image-side surface 82 | ∞ | 0.196401 | | | | |
| image plane 100 | | ∞ | | | | | |

| surface | K | a2 | a4 | a6 | a8 | a10 | a12 | a14 | a16 |
|---|---|---|---|---|---|---|---|---|---|
| 31 | -1.25058 | 0 | -0.02197 | -0.02159 | 0.586592275 | -1.94645 | -0.35713 | 5.567028 | -4.20812 |
| 32 | 0 | 0 | -0.16531 | 0.523383 | -1.882427801 | 1.062341 | -0.84144 | 5.821225 | -5.56302 |
| 41 | -349.512 | 0 | -0.10222 | 0.743422 | -2.995223039 | 3.302631 | -5.34039 | 13.40424 | -10.348 |
| 42 | -29.6166 | 0 | -0.00992 | 0.9291 | -3.361358535 | 5.283385 | -5.44339 | 4.009032 | -1.51387 |
| 51 | -20.6658 | 0 | 0.069011 | -0.14088 | 0.415075285 | -0.66045 | 0.163678 | 0.191833 | -0.10515 |
| 52 | 0 | 0 | 0.049219 | -0.04393 | -0.106352307 | 0.071429 | 0.261386 | -0.47095 | 0.192636 |
| 61 | -13.1536 | 0 | 0.113062 | 0.088887 | -0.005503174 | -0.0818 | -0.03837 | 0.081863 | -0.03809 |
| 62 | -1.26315 | 0 | 0.158836 | -0.06581 | 0.06712689 | 0.090699 | -0.00797 | -0.084468 | 0.032437 |
| 71 | -5.24452 | 0 | -0.21273 | 0.128472 | -0.056147146 | 0.00854 | 0.003082 | -0.00143 | 0.000183 |
| 72 | -3.73724 | 0 | -0.14316 | 0.096521 | -0.053962542 | 0.019766 | -0.00452 | 0.000562 | -2.9E-05 |

FIG.36 system focal length=2.392mm, half field-of-view=42.991°, F-number=2.092, system length=3.720mm

| lens element | surface | radius of curvature | thickness | refractive index | Abbe number | material | focal length |
|---|---|---|---|---|---|---|---|
| object | | ∞ | 300.000 | | | | |
| aperture stop 2 | | ∞ | -0.040 | | | | |
| first lens element 3 | object-side surface 31 | 2.372 | 0.551 | 1.544 | 56.114 | plastic | 2.658 |
| | image-side surface 32 | -3.432 | 0.055 | | | | |
| second lens element 4 | object-side surface 41 | 19.108 | 0.239 | 1.643 | 22.437 | plastic | -3.512 |
| | image-side surface 42 | 2.023 | 0.114 | | | | |
| third lens element 5 | object-side surface 51 | 2.207 | 0.412 | 1.535 | 55.712 | plastic | 7.412 |
| | image-side surface 52 | 4.633 | 0.217 | | | | |
| fourth lens element 6 | object-side surface 61 | -1.737 | 0.457 | 1.535 | 55.712 | plastic | 2.312 |
| | image-side surface 62 | -0.790 | 0.072 | | | | |
| fifth lens element 7 | object-side surface 71 | 2.258 | 0.685 | 1.531 | 55.744 | plastic | -2.815 |
| | image-side surface 72 | 0.806 | 0.450 | | | | |
| optical filter 8 | object-side surface 81 | ∞ | 0.210 | 1.517 | 64.167 | | |
| | image-side surface 82 | ∞ | 0.258 | | | | |
| image plane 100 | | | | | | | |

FIG.39

| surface | K | a2 | a4 | a6 | a8 | a10 | a12 | a14 | a16 |
|---|---|---|---|---|---|---|---|---|---|
| 31 | -4.07302 | 0 | -0.00356 | -0.30082 | 0.769557226 | -1.1643 | -1.15047 | 0.895157 | 3.22361 |
| 32 | -77.6394 | 0 | -0.28857 | 0.008671 | -0.125974238 | -0.52389 | 0.854652 | 0.85827 | -1.55904 |
| 41 | -14787.2 | 0 | -0.02391 | -0.41288 | 0.251938357 | -0.31907 | -0.3707 | 3.125218 | -2.95359 |
| 42 | -24.5084 | 0 | 0.017995 | 0.084455 | -0.557803816 | 0.486344 | 0.051473 | -0.20168 | 0 |
| 51 | -15.1998 | 0 | -0.21894 | 0.102255 | 0.054574703 | -0.0212 | -0.12248 | 0.231658 | -0.12368 |
| 52 | 0 | 0 | -0.0257 | -0.10852 | -0.064549549 | 0.013545 | 0.049222 | 0 | 0 |
| 61 | -8.18202 | 0 | 0.216732 | -0.04331 | -0.16134721 | 0.015757 | 0.085163 | 0.001654 | -0.03041 |
| 62 | -0.88362 | 0 | 0.364183 | -0.33297 | 0.283675155 | 0.020747 | -0.05553 | -0.03189 | 0.024834 |
| 71 | -0.59609 | 0 | -0.24068 | 0.036776 | 0.000282882 | -0.00445 | 0.000286 | 0.000749 | 0.000167 |
| 72 | -4.57199 | 0 | -0.08885 | 0.037136 | -0.011683584 | 0.001452 | 0.000171 | -8E-05 | 6.7E-06 |

FIG.40

| relationship | first preferred embodiment | second preferred embodiment | third preferred embodiment | fourth preferred embodiment | fifth preferred embodiment | sixth preferred embodiment | seventh preferred embodiment | eighth preferred embodiment | ninth preferred embodiment | tenth preferred embodiment |
|---|---|---|---|---|---|---|---|---|---|---|
| T1 | 0.503 | 0.464 | 0.547 | 0.491 | 0.495 | 0.504 | 0.453 | 0.68 | 0.415 | 0.551 |
| G12 | 0.099 | 0.082 | 0.053 | 0.185 | 0.247 | 0.254 | 0.262 | 0.061 | 0.113 | 0.055 |
| T2 | 0.185 | 0.25 | 0.245 | 0.25 | 0.336 | 0.293 | 0.293 | 0.172 | 0.25 | 0.239 |
| G23 | 0.058 | 0.06 | 0.117 | 0.06 | 0.179 | 0.137 | 0.134 | 0.108 | 0.079 | 0.114 |
| T3 | 0.501 | 0.48 | 0.386 | 0.379 | 0.406 | 0.35 | 0.35 | 0.306 | 0.592 | 0.412 |
| G34 | 0.25 | 0.32 | 0.233 | 0.424 | 0.084 | 0.101 | 0.099 | 0.216 | 0.199 | 0.217 |
| T4 | 0.584 | 0.515 | 0.444 | 0.607 | 0.55 | 0.718 | 0.793 | 0.481 | 0.57 | 0.457 |
| G45 | 0.062 | 0.06 | 0.141 | 0.06 | 0.269 | 0.18 | 0.176 | 0.202 | 0.06 | 0.072 |
| T5 | 0.544 | 0.519 | 0.532 | 0.5 | 0.404 | 0.54 | 0.496 | 0.593 | 0.509 | 0.685 |
| G5F | 0.794 | 0.721 | 0.45 | 0.5 | 0.5 | 0.5 | 0.5 | 0.45 | 0.734 | 0.45 |
| TF | 0.21 | 0.21 | 0.21 | 0.21 | 0.21 | 0.21 | 0.21 | 0.21 | 0.21 | 0.21 |
| GFP | 0.133 | 0.219 | 0.404 | 0.343 | 0.326 | 0.317 | 0.318 | 0.274 | 0.196 | 0.258 |
| EFL | 2.629 | 2.69 | 2.58 | 2.68 | 2.68 | 2.679 | 2.679 | 2.682 | 2.608 | 2.392 |
| ALT | 2.317 | 2.228 | 2.154 | 2.227 | 2.191 | 2.405 | 2.385 | 2.232 | 2.336 | 2.344 |
| Gaa | 0.469 | 0.522 | 0.544 | 0.729 | 0.779 | 0.672 | 0.671 | 0.587 | 0.451 | 0.458 |
| BFL | 1.137 | 1.15 | 1.064 | 1.053 | 1.036 | 1.027 | 1.028 | 0.934 | 1.14 | 0.918 |
| TTL | 3.923 | 3.9 | 3.762 | 4.009 | 4.006 | 4.104 | 4.084 | 3.753 | 3.927 | 3.72 |

FIG.42

| relationship | first preferred embodiment | second preferred embodiment | third preferred embodiment | fourth preferred embodiment | fifth preferred embodiment | sixth preferred embodiment | seventh preferred embodiment | eighth preferred embodiment | ninth preferred embodiment | tenth preferred embodiment |
|---|---|---|---|---|---|---|---|---|---|---|
| G12+G23+G45 | 0.219 | 0.202 | 0.311 | 0.305 | 0.695 | 0.571 | 0.572 | 0.371 | 0.252 | 0.241 |
| Gaa/T3 | 0.936 | 1.088 | 1.409 | 1.923 | 1.919 | 1.920 | 1.917 | 1.918 | 0.762 | 1.112 |
| T2/G34 | 0.740 | 0.781 | 1.052 | 0.590 | 4.000 | 2.901 | 2.960 | 0.796 | 1.256 | 1.101 |
| T4/T3 | 1.166 | 1.073 | 1.150 | 1.602 | 1.355 | 2.051 | 2.266 | 1.572 | 0.963 | 1.109 |
| T4/G34 | 2.336 | 1.609 | 1.906 | 1.432 | 6.548 | 7.109 | 8.010 | 2.227 | 2.864 | 2.106 |
| Gaa/T2 | 2.535 | 2.088 | 2.220 | 2.916 | 2.318 | 2.294 | 2.290 | 3.413 | 1.804 | 1.916 |
| T1/G34 | 2.012 | 1.450 | 2.348 | 1.158 | 5.893 | 4.990 | 4.576 | 3.148 | 2.085 | 2.539 |
| Gaa/(G12+G23+G45) | 2.142 | 2.584 | 1.749 | 2.390 | 1.121 | 1.177 | 1.173 | 1.582 | 1.790 | 1.900 |
| T1/(G12+G23+G45) | 2.297 | 2.297 | 1.759 | 1.610 | 0.712 | 0.883 | 0.792 | 1.833 | 1.647 | 2.286 |
| EFL/(G12+G23+G45) | 12.005 | 13.317 | 8.296 | 8.787 | 3.856 | 4.692 | 4.684 | 7.229 | 10.349 | 9.925 |
| T5/(G12+G23+G45) | 2.484 | 2.569 | 1.711 | 1.639 | 0.581 | 0.946 | 0.867 | 1.598 | 2.020 | 2.842 |
| ALT/T5 | 4.259 | 4.293 | 4.049 | 4.454 | 5.423 | 4.454 | 4.808 | 3.764 | 4.589 | 3.422 |
| T1/T3 | 1.004 | 0.967 | 1.417 | 1.296 | 1.219 | 1.440 | 1.294 | 2.222 | 0.701 | 1.337 |
| T3/T2 | 2.708 | 1.920 | 1.576 | 1.516 | 1.208 | 1.195 | 1.195 | 1.779 | 2.368 | 1.724 |
| EFL/T2 | 14.211 | 10.760 | 10.531 | 10.720 | 7.976 | 9.143 | 9.143 | 15.593 | 10.432 | 10.008 |
| ALT/(G12+G23+G45) | 10.580 | 11.030 | 6.926 | 7.302 | 3.153 | 4.212 | 4.170 | 6.016 | 9.270 | 9.726 |

FIG.43

IMAGING LENS, AND ELECTRONIC APPARATUS INCLUDING THE SAME

CROSS-REFERENCE TO RELATED APPLICATION

This application claims priority of Chinese Patent application No. 201410084670.6, filed on Mar. 10, 2014.

BACKGROUND OF THE INVENTION

1. Field of the Invention

The present invention relates to an imaging lens and en electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. Patent Application Publication Nos. 20110316969 and 20130107376, U.S. Pat. No. 8,456,758 and Japanese Patent Publication No. 2013-11710 discloses a relatively long conventional imaging lens that includes five lens elements. The conventional imaging lens disclosed in U.S. Patent application Publication No. 20110316969 has a length greater than 14 mm, which renders it unsuitable to be incorporated into a mobile phone, a digital camera and/or other portable electronic devices with a thin design.

Reducing the system length of one imaging lens while maintaining satisfactory optical performance is always a goal in one industry.

SUMMARY OF THE INVENTION

Therefore, the object of the present invention, is to provide an imaging lens having a shorter overall length while maintaining good optical performance.

According to one aspect of the present invention, there is provided an imaging lens including an aperture stop, a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side, and an image-side surface facing toward the image side.

The image-side surface of the first lens element has a convex portion in a vicinity of a periphery of the first lens element. The image-side surface of the second lens element has a convex portion in a vicinity of a periphery of the second lens element. The image-side surface of the third lens element has a concave portion in a vicinity of the optical axis, and a convex portion in a vicinity of a periphery of the third lens element. The object-side surface of the fourth lens element has a concave portion in a vicinity of the optical axis. The image-side surface of the fifth lens element has a concave portion in a vicinity of the optical axis, and the fifth lens element is made of a plastic material. The imaging lens does not include any lens element with refractive power other than the first lens element, the second lens element, the third lens element, the fourth lens element and the fifth lens element.

The imaging lens satisfies Gaa/T3≤1.95, where Gaa represents a sum on air gap lengths among the first lens element, the second lens element, the third lens element, the fourth lens element and the fifth lens element at the optical axis, and T3 represents a thickness of the third lens element at the optical axis.

Another object, of the present invention is to provide an electronic apparatus including an imaging lens with five lens elements.

According to another aspect of the present invention, there is provided an electronic apparatus including a housing and an imaging module. The imaging module is disposed in the housing, and includes the imaging lens of this invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some opt real data corresponding to the imaging lens of the first preferred embodiment;

FIG. 4 shows values of some aspherical coefficients corresponding to the imaging lens of one first preferred embodiment;

FIG. 7 shows values of some optical data corresponding to the imaging lens of the second preferred embodiment;

FIG. 8 shows values of some aspherical coefficients corresponding to the imaging lets of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 snows values of some aspherical coefficients corresponding to the imaging lens of the sixth preferred embodiment;

FIG. 27 shows values of some optical data corresponding to the imaging lens of the seventh preferred embodiment;

FIG. 28 shows values of some aspherical coefficients corresponding to the imaging lens of the seventh preferred embodiment;

FIG. 31 shows values of some optical data corresponding to the imaging lens of the eighth preferred embodiment;

FIG. 32 shows values of some aspherical coefficients corresponding to the imaging lens of the eighth preferred embodiment;

FIG. 35 shows values of some optical data corresponding to the imaging lens of the ninth preferred embodiment;

FIG. 36 shows values of some aspherical coefficients corresponding to the imaging lens of the ninth preferred embodiment;

FIG. 39 shows values of some optical data corresponding to the imaging lens of the tenth preferred embodiment;

FIG. 40 shows values of some aspherical coefficients corresponding to the imaging lens of the tenth preferred embodiment;

FIGS. 42 and 43 are tables that list values of relationships among some lens parameters corresponding to the imaging lenses of the first to tenth preferred embodiments;

DETAILED DESCRIPTION OF THE PREFERRED EMBODIMENTS

Figure 1:
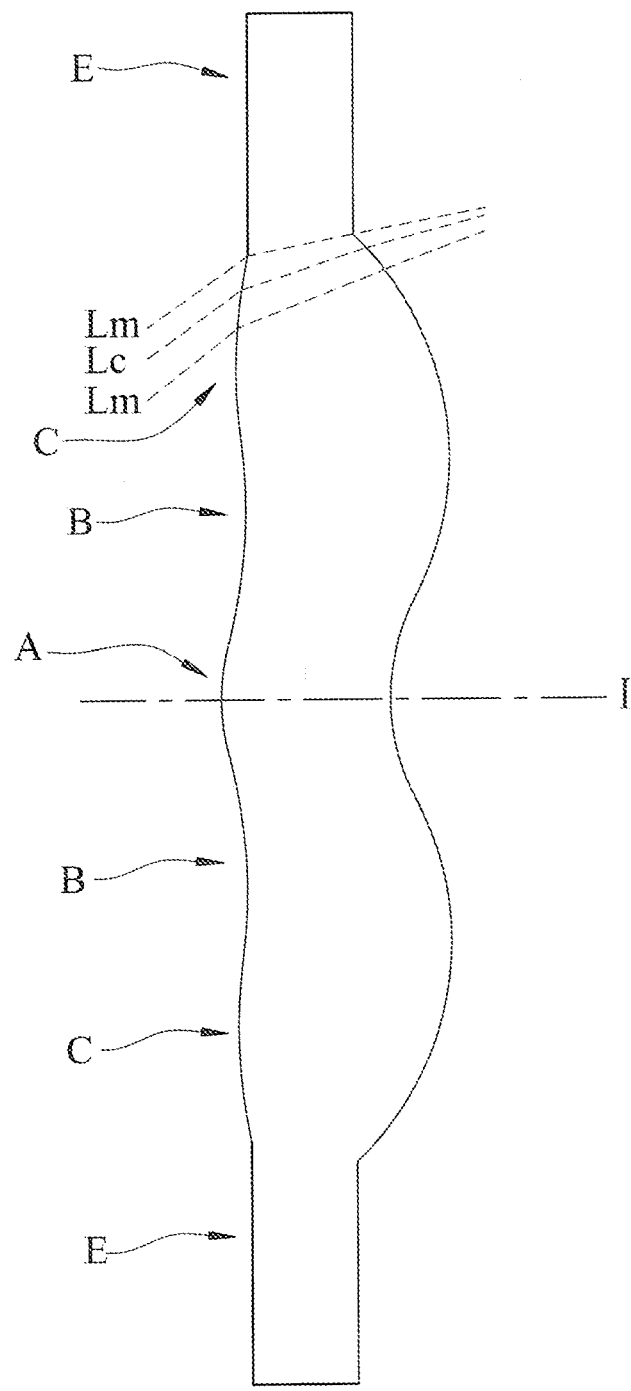
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radically exterior urea adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E as not depicted in the drawings for the sake of clarity.

Figure 2:
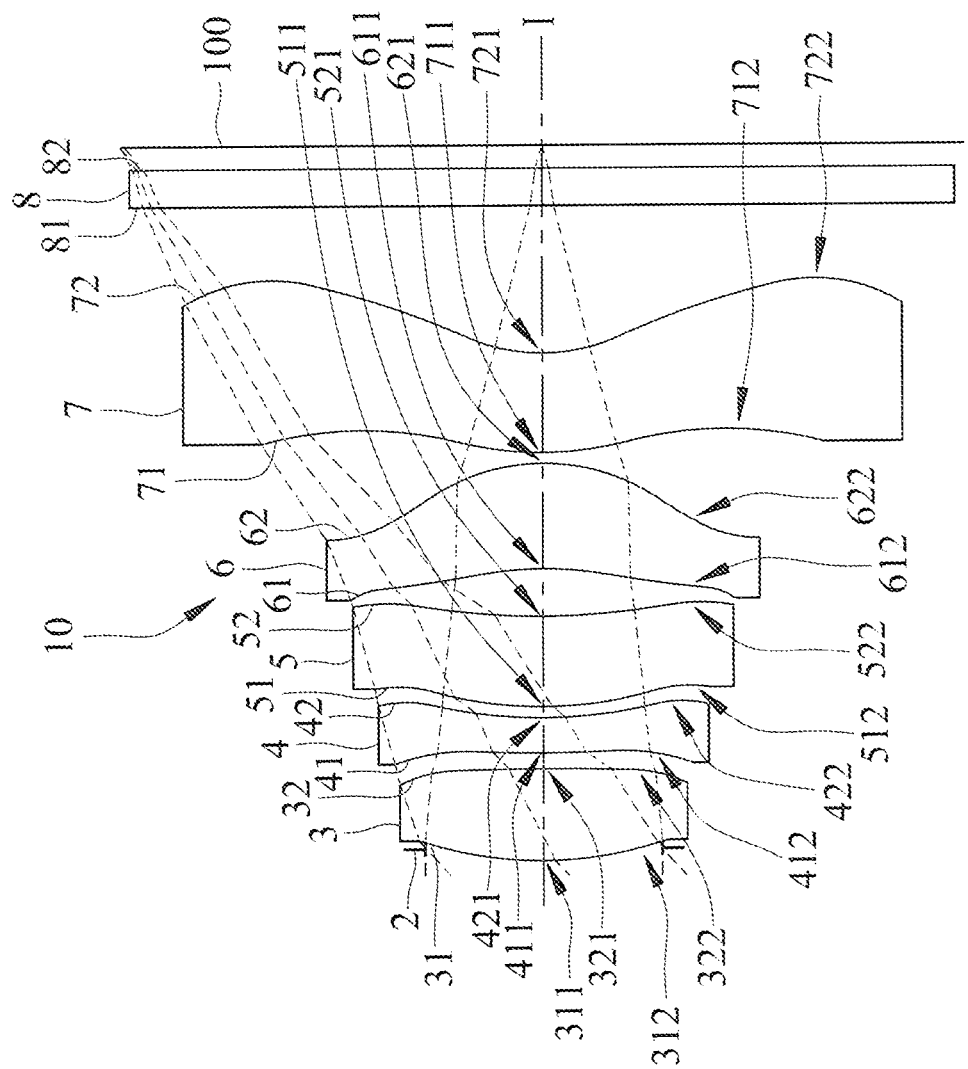
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6, a fifth lens element 7 and an optical filter 8 arranged in the given order from an object side to an image side along an optical axis (I) of the imaging lens 10. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, end an image-side surface 32, 42, 52, 62, 72, 32 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of optical filter 8, in the given order, to form an image on the image plane 100. In this embodiment, each of the object-side surfaces 31, 41, 51, 61, 71 and the image-side surfaces 32, 42, 52, 62, 72 is aspherical and has a center point coinciding with the optical axis (I).

Each of the lens elements 3-7 is made of a plastic material and has a refractive power in this embodiment. However, at least one of the lens elements 3-6 may be made of other materials in other embodiments.

In the first preferred embodiment, which is depicted an FIG. 2, the first lens element 3 has a positive refractive dower. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 has a convex portion 411 in a vicinity of the optical axis (I), and a concave portion 412 in a vicinity of a periphery of the second lens element 4. The image-side surface 42 of the second lens element 4 has a concave portion 421 in a vicinity of the optical axis (I), and a convex portion 422 in a vicinity of the periphery of the second lens element 4.

The third lens element 5 has a positive refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a concave portion 521 in a vicinity of the optical axis (I), and a convex portion 522 in a vicinity of the periphery of the third lens element 5.

The fourth lens element 6 has a positive refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a positive refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

In the first preferred embodiment, the imaging lens 10 does not include any lens element with refractive power other than the aforesaid lens elements 3-7.

Shown in FIG. 3 is a table that lists values of some optical data corresponding to the surfaces 31-61, 32-82 of the first preferred embodiment. The imaging lens 10 has an overall system effective focal length (EFL) of 2.629 mm, a half field-of-view (HFOV) of 40.525°, an F-number of 2.05, and a system length of 3.923 mm. The system length refers to a distance between the object-side surface 31 of the first lens element 3 and the image plane 100 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of tire aspherical surface at the optical axis (I);

Y represents a perpendicular distance between the arbitrary point on the aspherical surface and the opt real axis (I);

K represents a conic constant; and $\alpha_{2i}$ represents a $2i^{th}$ aspherical coefficient.

Shown in FIG. 4 is a table that lists values of some aspherical coefficients of the aforementioned relationship (1) corresponding to the first preferred embodiment. Each row in FIG. 4 lists the aspherical values of a respective one of the object-side surfaces 31-71 and the image-side surfaces 32-72.

Relationships among some of the lens parameters corresponding to the first preferred embodiment are shown in FIGS. 42 and 43 where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between tine third lens element 5 and the fourth element 6 at the optical axis (I);

G45 represents an air gap length between the fourth lens element 6 and the fifth lens element 7 at the optical axis (I);

G5F represents an air gap length between the fifth lens element 7 and the optical filter 8 at the optical axis (I);

TF represents e thickness of one optical filter 8 at the optical axis (I);

GFP represents an air gap length between one optical filter 8 and the image plane 100 at the optical axis (I);

Gaa represents a sum of the air gap lengths among one first lens element 3, the second lens element 4, the third lens element 5, the fourth lens element 6 and the fifth lens element 7 at the optical axis (I) (i.e., the sum of G12, G23, G34 and G45);

ALT represents a sum of the thicknesses of the first lens element 3, the second lens element 4, the third lens element 5, the fourth lens element 6 and the fifth lens element 7 at the optical axis (I) (i.e., the sum of T1, T2, T3, T4 and T5);

TTL represents a distance between the object-side surface 31 of the first lens element 3 and the image plane 100 at the optical axis (I);

BFL represents a distance between the image-side surface 72 of the fifth lens element 7 and the image plane 100 at the optical axis (I) (i.e., the sum of G5F, TF and GFF); and EFL represents a system focal length of the imaging lens 10.

FIGS. 5(a) to 5(d) respectively shoe simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figures 5A, 5B, 5C, 5D:
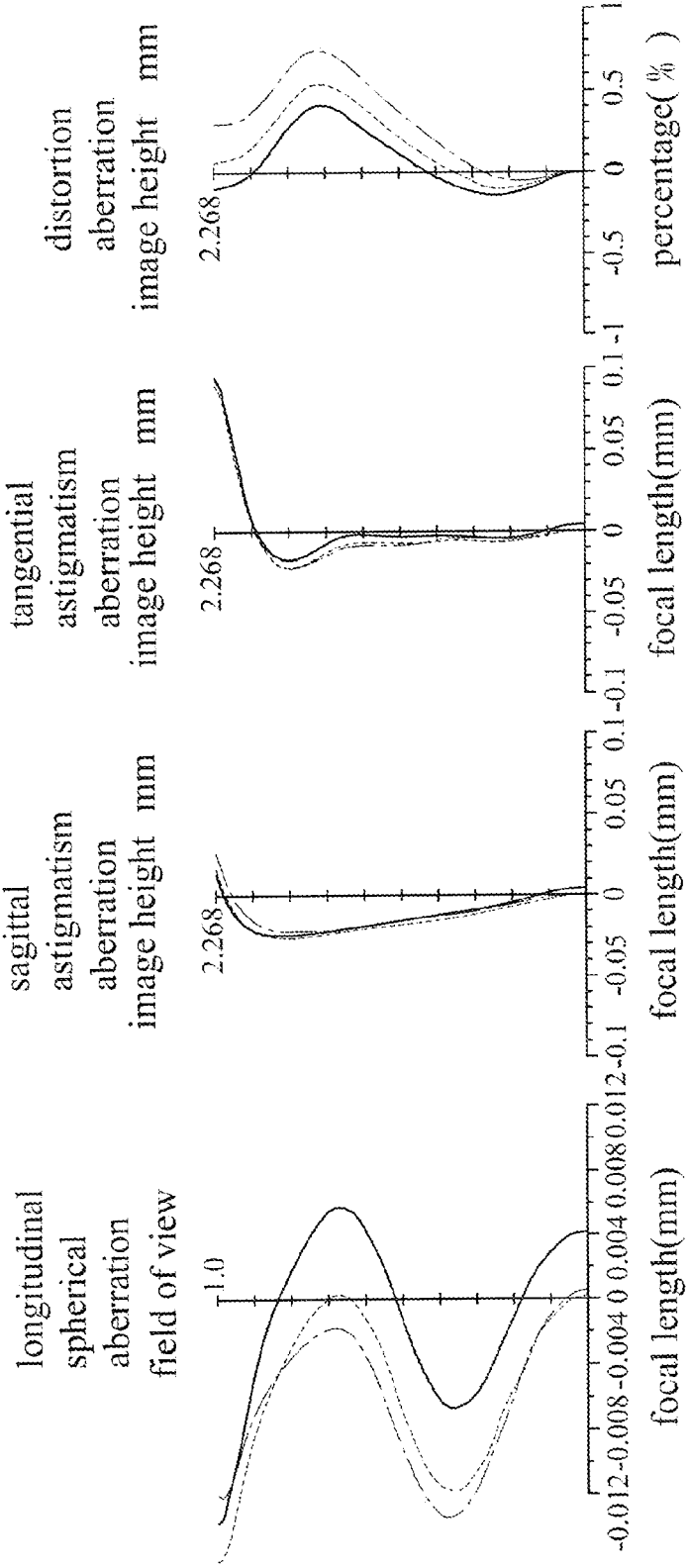
FIGS. 5($a$) to 5($d$) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.02 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, as shown in FIG. 5(d), since each of the curves corresponding to distortion aberration falls within the range of ±1%, the first preferred embodiment is able to meet requirements in imaging quality of most optical systems.

In view of the above, even with the system length reduced down to 3.923 mm, the imaging lens 10 of the first preferred embodiment is still able to achieve a relatively good optical performance.

Figure 6:
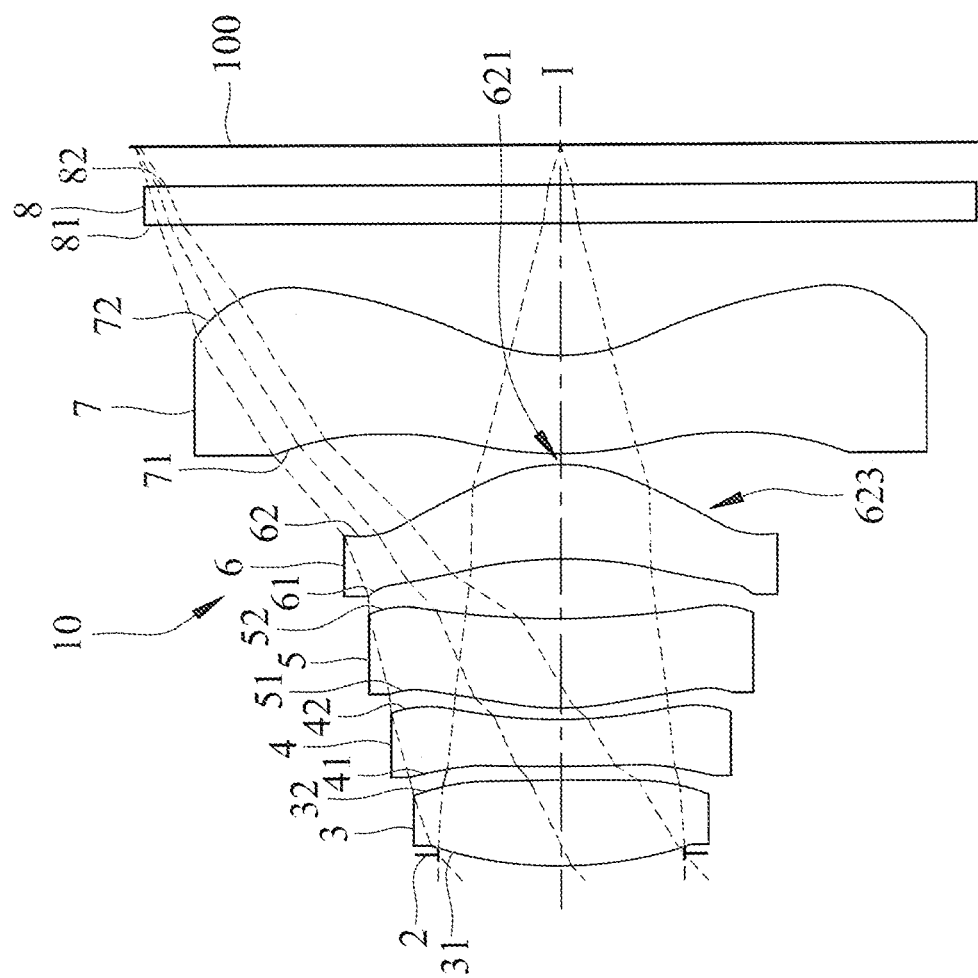
FIG. 6 is a schematic diagram that illustrates the second preferred embodiment of an imaging lens according to the present invention.
Figure 9:
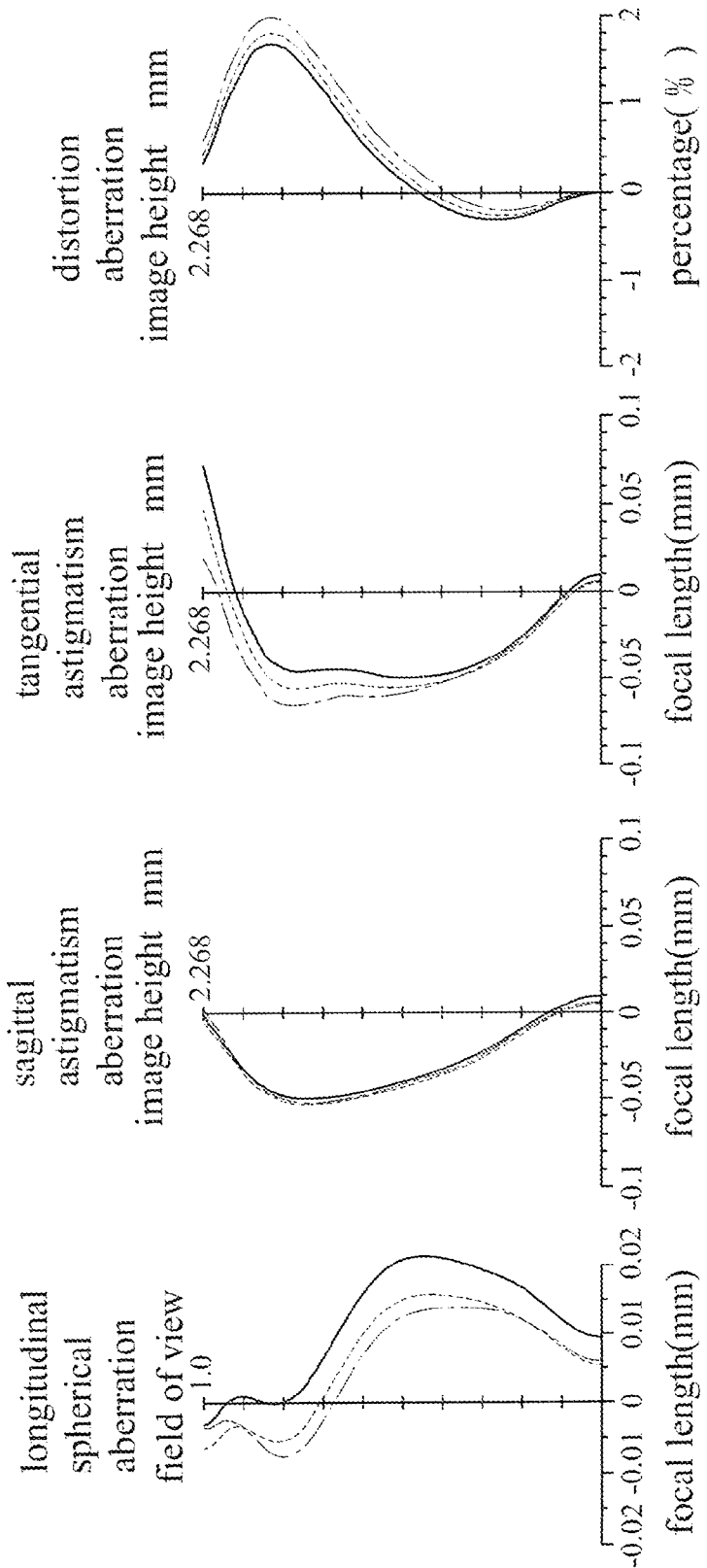
FIGS. 9($a$) to 9($d$) show different optical characteristics of the imaging lens of the second preferred embodiment.

Referring to FIG. 6, the differences between the first and second preferred embodiments of the imaging lens 10 of this invention reside in that: the image-side surface 62 of the fourth lens element 6 has a coiner portion 621 in a vicinity of the optical axis (I), and a concave portion 623 in a vicinity of the periphery of the fourth lens element 6. It should be noted herein that, in order to clearly illustrate the second preferred embodiment, reference numerals of the convex and concave portions that are the same as those of the first preferred embodiment have been omitted in FIG. 6.

Shown in FIG. 7 is a table that lists values of some optical data corresponding to the surfaces 31-81, 32-82 of the second preferred embodiment. The imaging lens 10 has an overall system focal length of 2.69 mm, an HFOV of 39.812°, an F-number of 2.05, and a system length of 3.900 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are shown in FIGS. 42 and 43.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 3(d) that the second preferred embodiment is able to achieve a relatively good optical performance.

Figure 10:
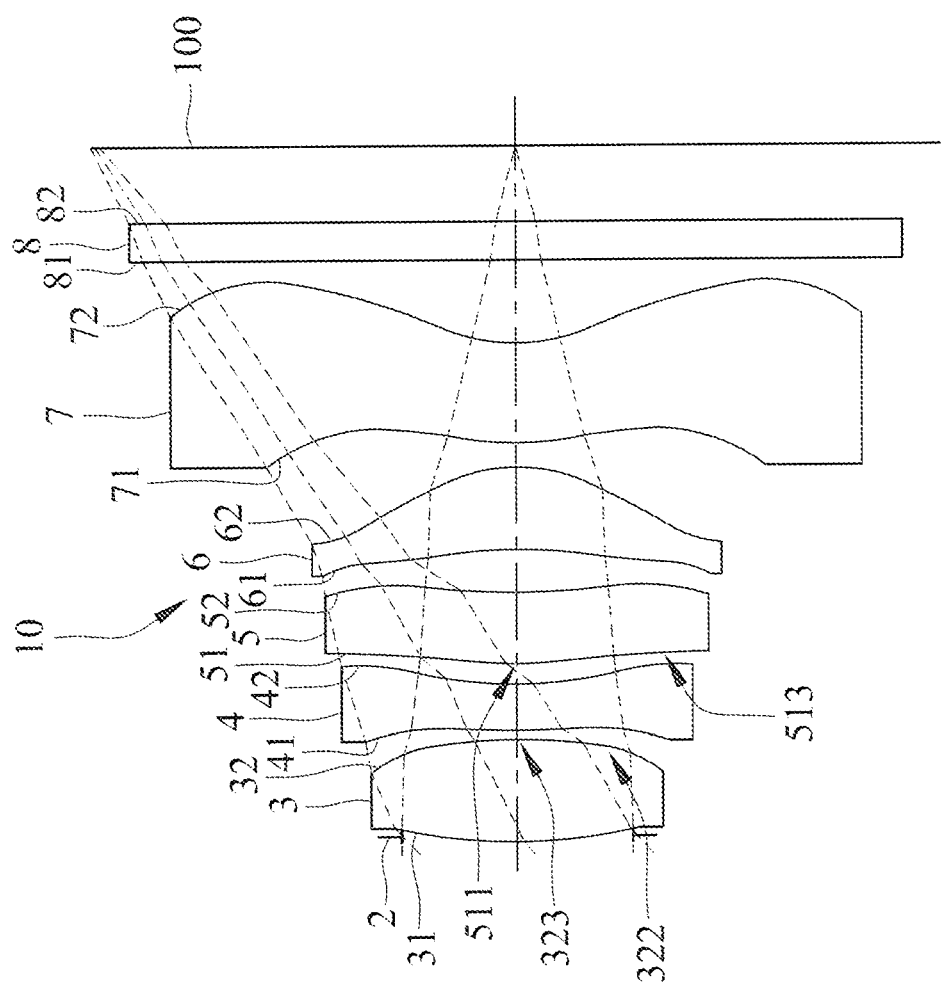
FIG. 10 is a schematic diagram that illustrates the third preferred embodiment of an imaging lens according to the present invention.
Figures 13A, 13B, 13C, 13D:
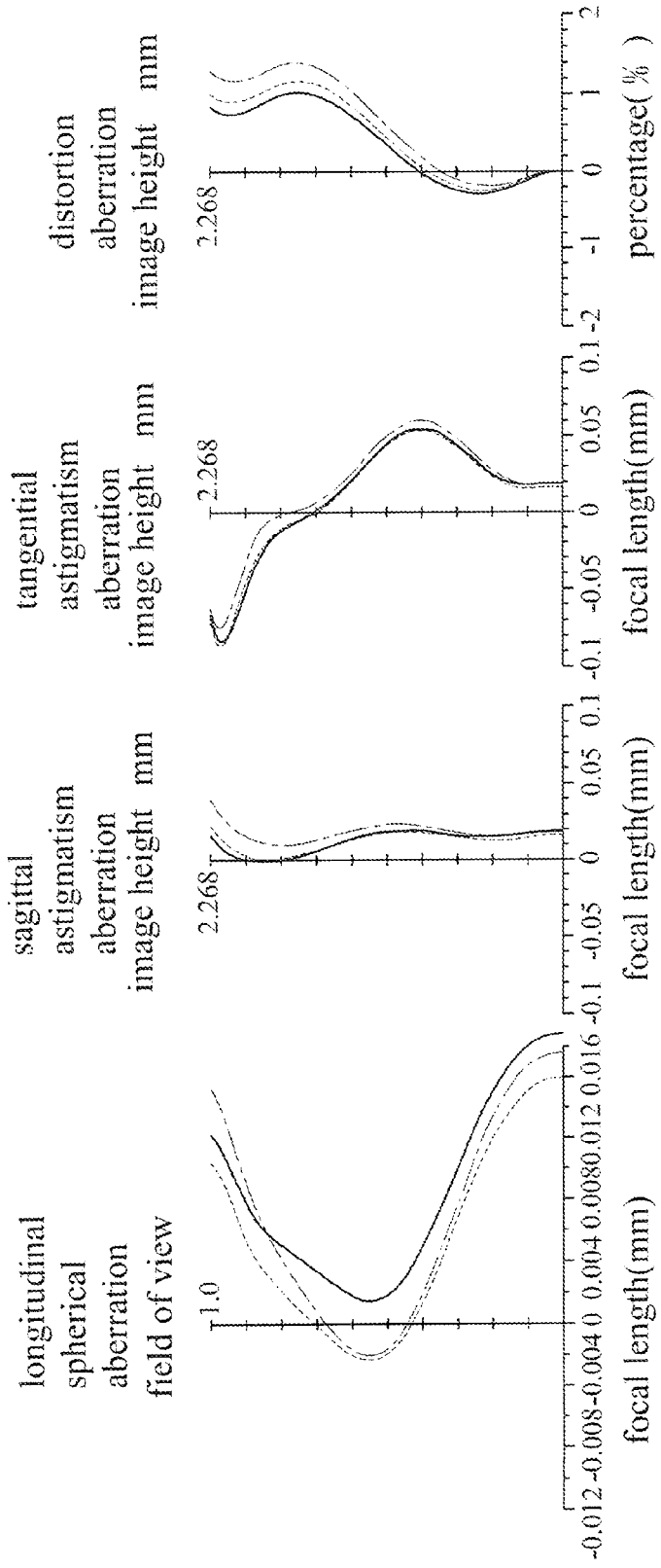
FIGS. 13($a$) to 13($d$) show different optical characteristics of the imaging lens of the third preferred embodiment.

FIG. 10 illustrates a third preferred embodiment of an imaging lens 10 according to the present invention, which has a configuration similar to that of the first preferred embodiment and differs in that: the image-side surface 32 of the first lens element 3 is a convex surface that has a convex portion 323 in a vicinity of the optical axis (I), and a convex portion 322 in a vicinity of the periphery of the first lens element 3. The object-side surface 51 of the third lens element 5 is a convex surface that has a convex portion 511 in a vicinity of the optical axis (I), and a convex portion 513 in a vicinity of the periphery of the third lens element 5. It should be noted herein that, in order to clearly illustrate the third preferred embodiment, reference numerals of the convex and concave portions that are the same as those of the first preferred embodiment have been omitted in FIG. 10.

Shown in FIG. 11 is a table that lists values of some optical date corresponding to the surfaces 31-81, 32-82 of the third preferred embodiment. The imaging lens 10 has an overall system focal length of 2.58 mm, an HFOV of 40.956°, an F-number of 2.08, and a system length of 3.762 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are shown in FIGS. 42 and 43.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
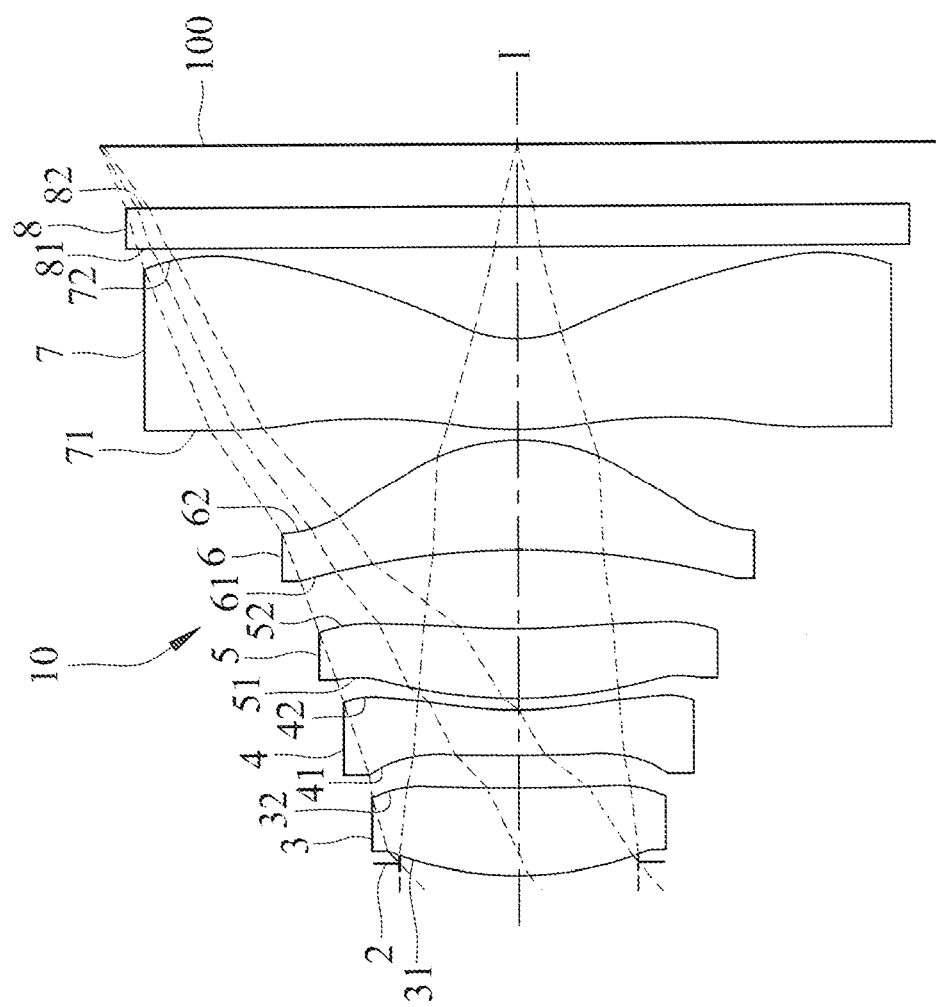
FIG. 14 is a schematic diagram that illustrates the fourth preferred embodiment of an imaging lens according to the present invention.
Figure 17:
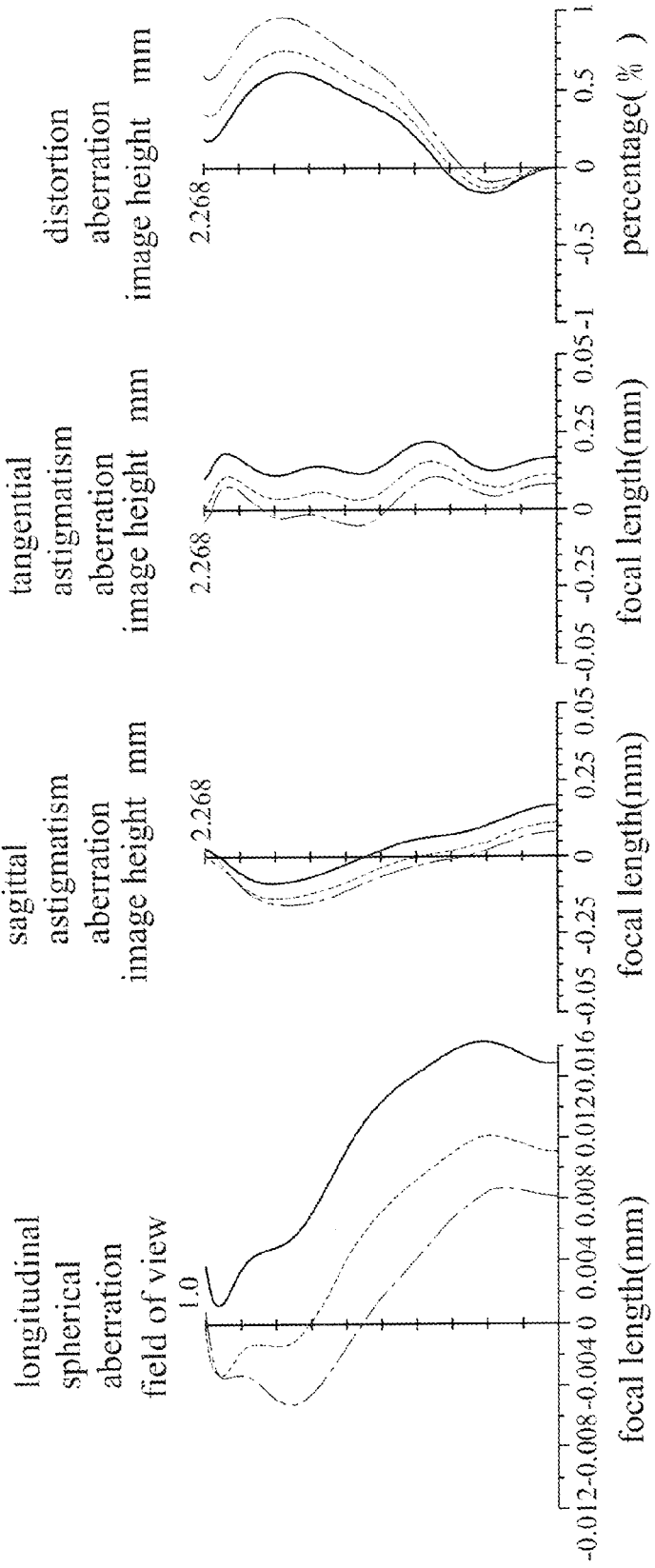
FIGS. 17($a$) to 17($d$) show different optical characteristics of the imaging lens of the fourth preferred embodiment.

Referring to FIG. 14, a fourth preferred embodiment of the imaging lens 10 of this invention is shown. The differences between the first and fourth preferred embodiments reside in modifications of some optical data, aspherical coefficients and lens parameters of the lens elements 3-7. It should be noted herein that, in order to clearly illustrate the fourth preferred embodiment, reference numerals of the convex and concave portions that are the same as those of the first preferred embodiment nave been omitted in FIG. 14.

Shown in FIG. 15 is a table that lists values of some optical data corresponding to the surfaces 31-81, 32-82 of the fourth preferred embodiment. The imaging lens 10 has an overall system focal length of 2.63 mm, an HFOV of 40.010°, an F-number of 2.053, and a system length of 4.009 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are shown in FIGS. 42 and 43.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
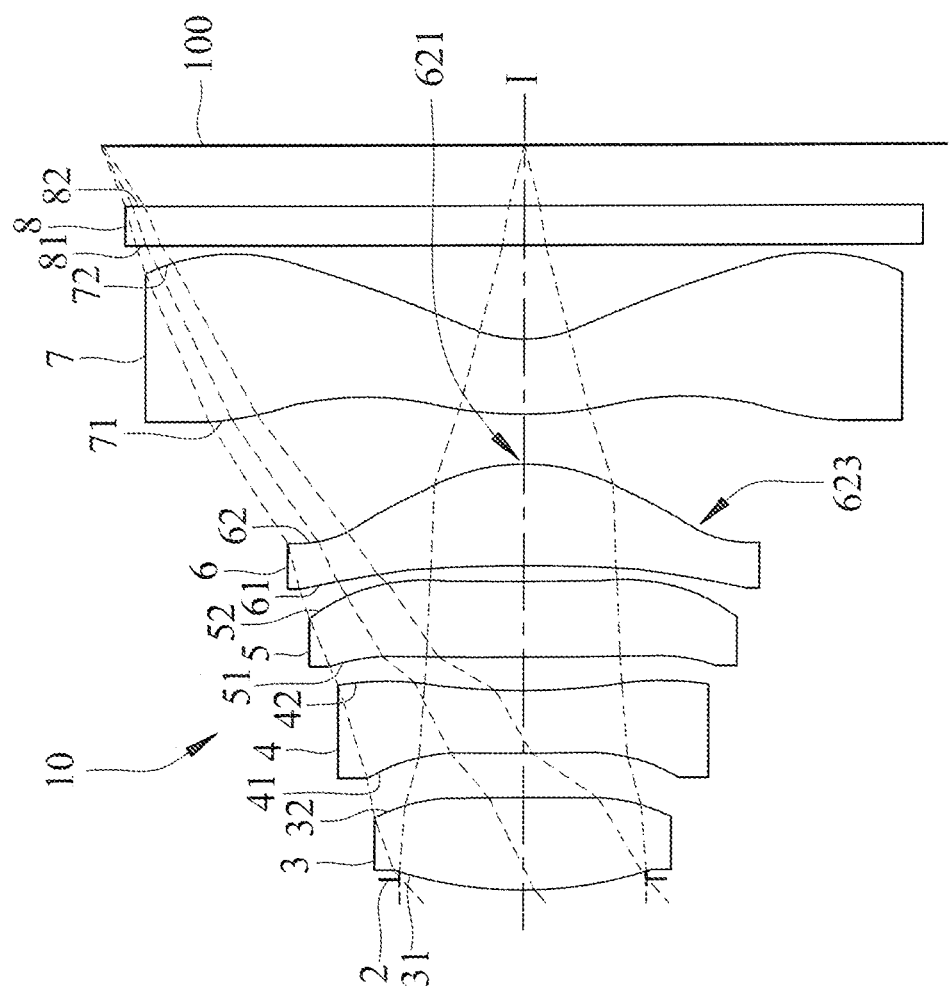
FIG. 18 is a schematic diagram char illustrates the fifth preferred embodiment of an imaging lens according to the present invention.
Figure 21:
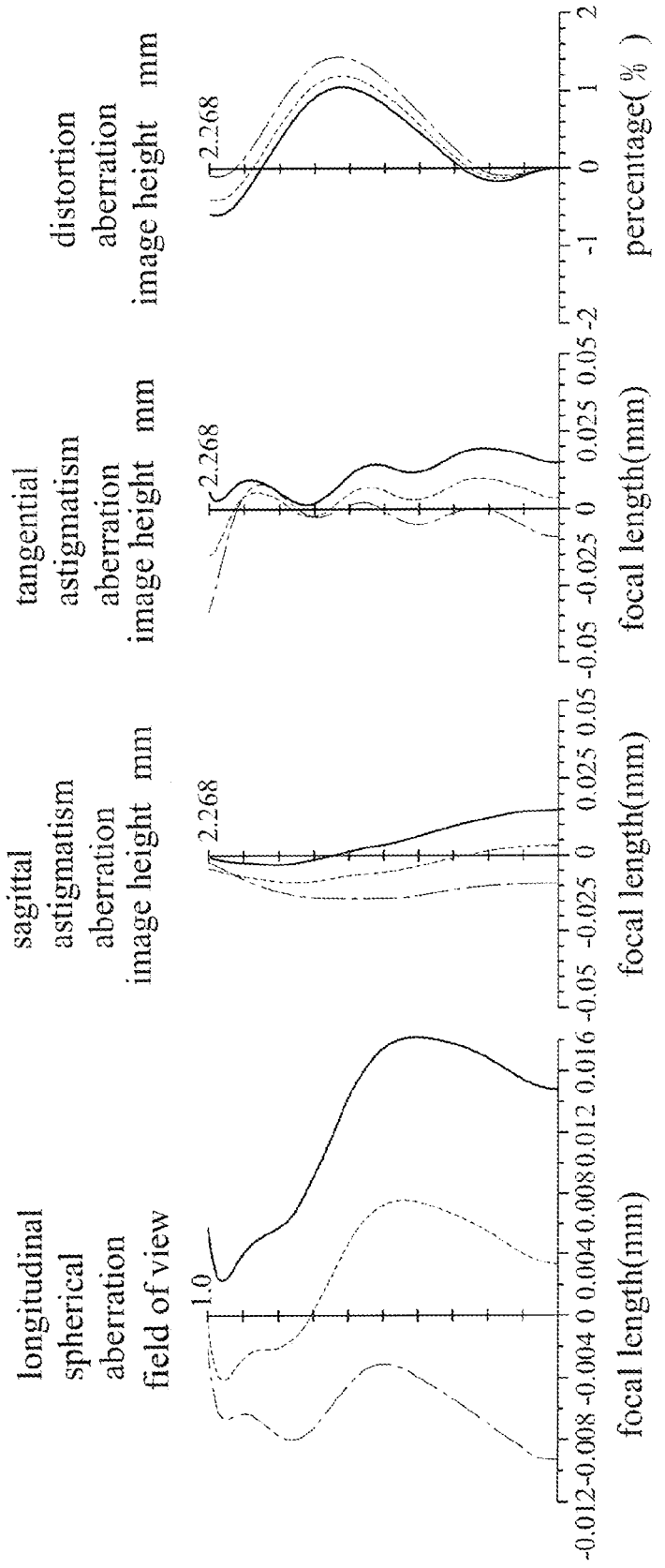
FIGS. 21(a) to 21(d) show different optical characteristics of the imaging lens of the fifth preferred embodiment.

FIG. 18 illustrates a fifth preferred embodiment of an imaging lens 10 according to the present invention, which has a configuration similar to that of the second preferred embodiment, where the image-side surface 62 of the fourth lens element 6 has a convex portion 621 in a vicinity of the optical axis (I), and a concave portion 623 in a vicinity of the periphery of the fourth lens element 6, in addition to modifications of some optical data, aspherical coefficients and lens parameters of the lens elements 3-7. It should, be noted herein chat, in order to clearly illustrate the fifth preferred embodiment, reference numerals of the convex and concave portions that are the same as those of the first preferred embodiment have been omitted in FIG. 18.

Shown in FIG. 19 is a table that lists values of some optical data corresponding to the surfaces 31-81, 32-82 of the fifth preferred embodiment. The imaging lens 10 has an overall system focal length of 2.68 mm, an HFOV of 40.127°, an F-number of 2.060, and a system length of 4.006 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are shown in FIGS. 42 and 43.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able no achieve a relatively good optical performance.

Figure 22:
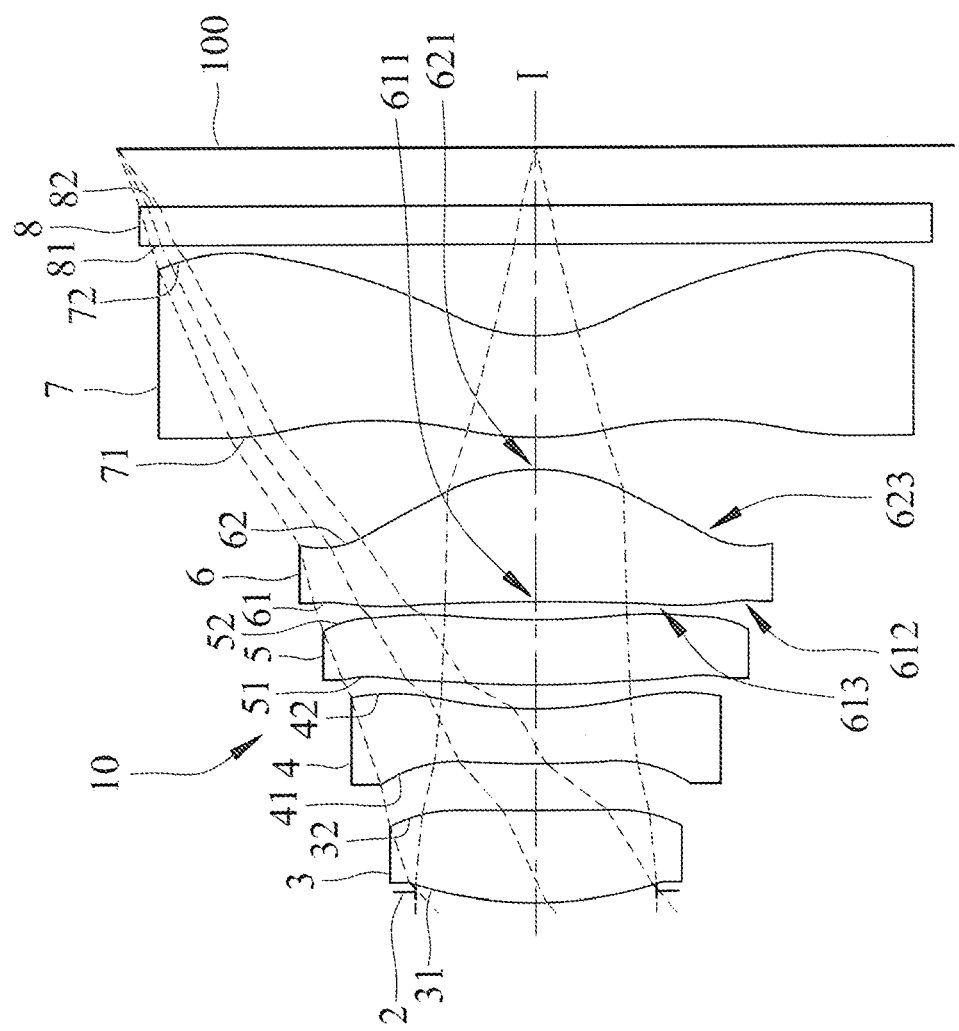
FIG. 22 is a schematic diagram that illustrates the sixth preferred embodiment of an imaging lens according to the present invention.
Figure 25:
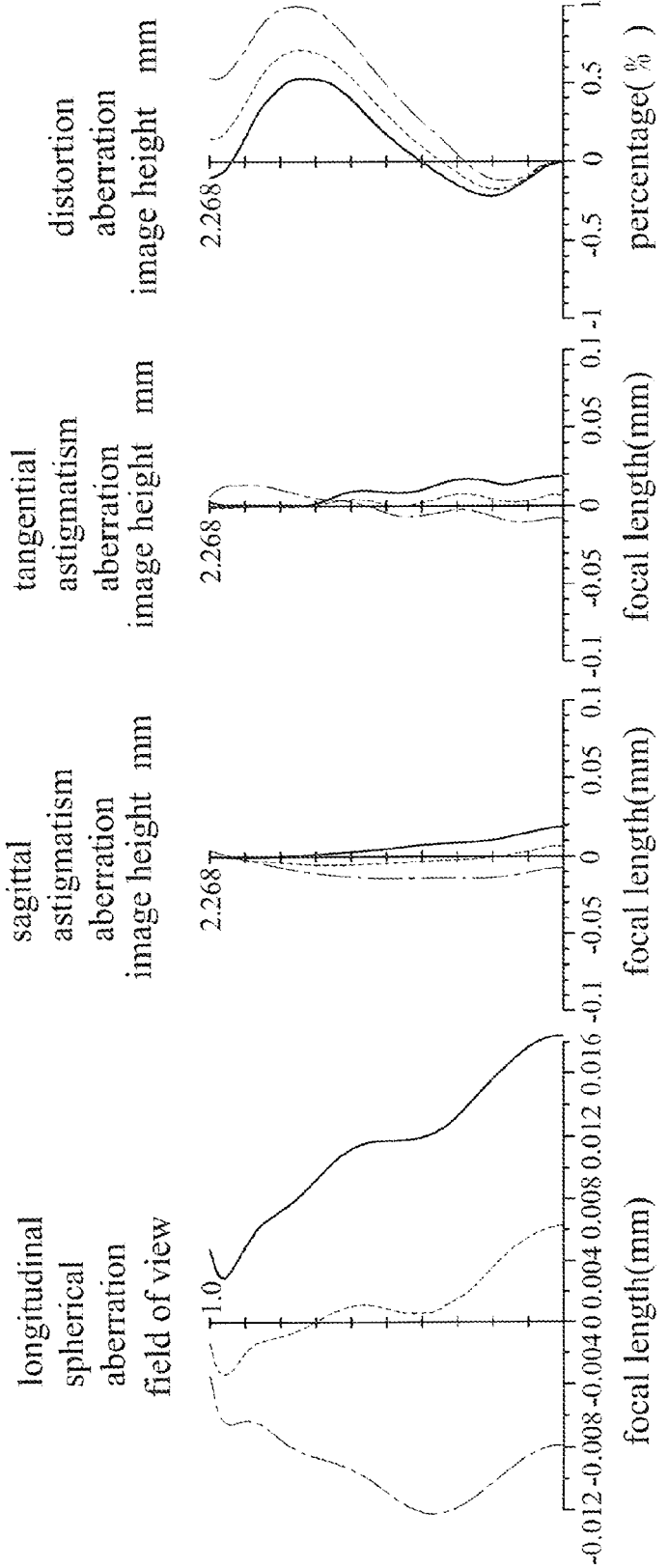
FIGS. 25(a) to 25(d) show different optical characteristics of the imaging lens of the sixth preferred embodiment.

FIG. 22 illustrates a sixth preferred embodiment of an imaging lens 10 according to the present invention, which has a configuration similar to that of the first preferred embodiment and differs in that: the object-side surface 61 of the fourth lens element 6 has a concave portion 611 in a vicinity of the optical axis (I), a concave portion 612 in a vicinity of the periphery of the fourth lens element 6, and a convex portion 613 disposed between the concave portions 611, 612. The image-side surface 62 of the fourth lens element 6 has a convex portion 621 in a vicinity of the optical axis (I), and a concave portion 623 in a vicinity of the periphery of the fourth lens element 6. It should be noted herein that, in order to clearly illustrate the sixth preferred embodiment, reference numerals of the convex and concave portions that are the same as those of the first preferred embodiment have been omitted in FIG. 22.

Shown in FIG. 23 is a table that lists values of some optical data corresponding to the surfaces 31-81, 32-82 of the sixth preferred embodiment. The imaging lens 10 has an overall system focal length of 2.679 mm, an HFOV of 40.020°, an F-number of 2.057, and a system length of 4.104 mm.

Shown in FIG. 24 is a table that lasts values of some aspherical coefficients of the aforementioned relationship (1) corresponding to the sixth preferred embodiment.

Relationships among some of the aforementioned lens parameters corresponding to the sixth preferred embodiment are shown in FIGS. 42 and 43.

FIGS. 25(a) to 25(d) respectively show simulation results corresponding to longitudinal spherical aberration, sagittal astigmatism aberration, tangential astigmatism aberration, end distortion aberration of the sixth preferred embodiment. It can be understood from FIGS. 25(a) to 25(d) that the sixth preferred embodiment is able to achieve a relatively good optical performance.

Figure 26:
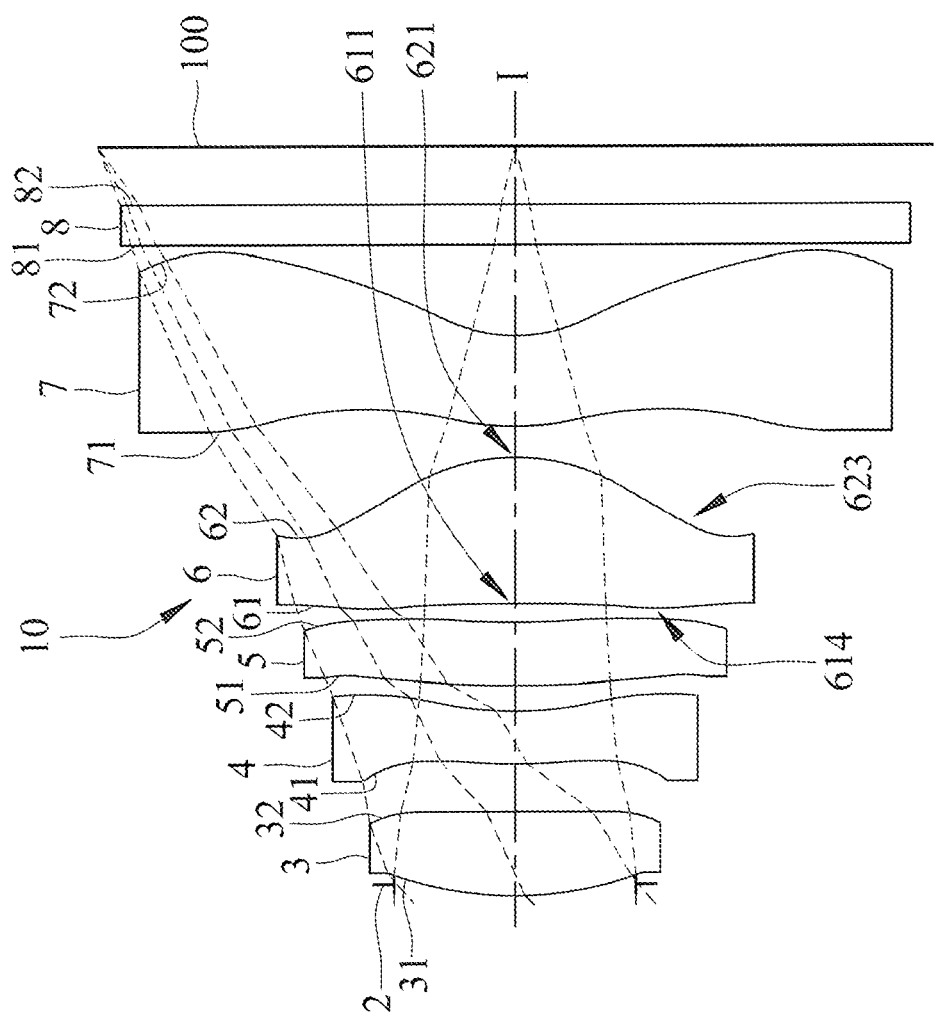
FIG. 26 is a schematic diagram that illustrates the seventh preferred embodiment of an imaging lens according to the present invention.
Figure 29:
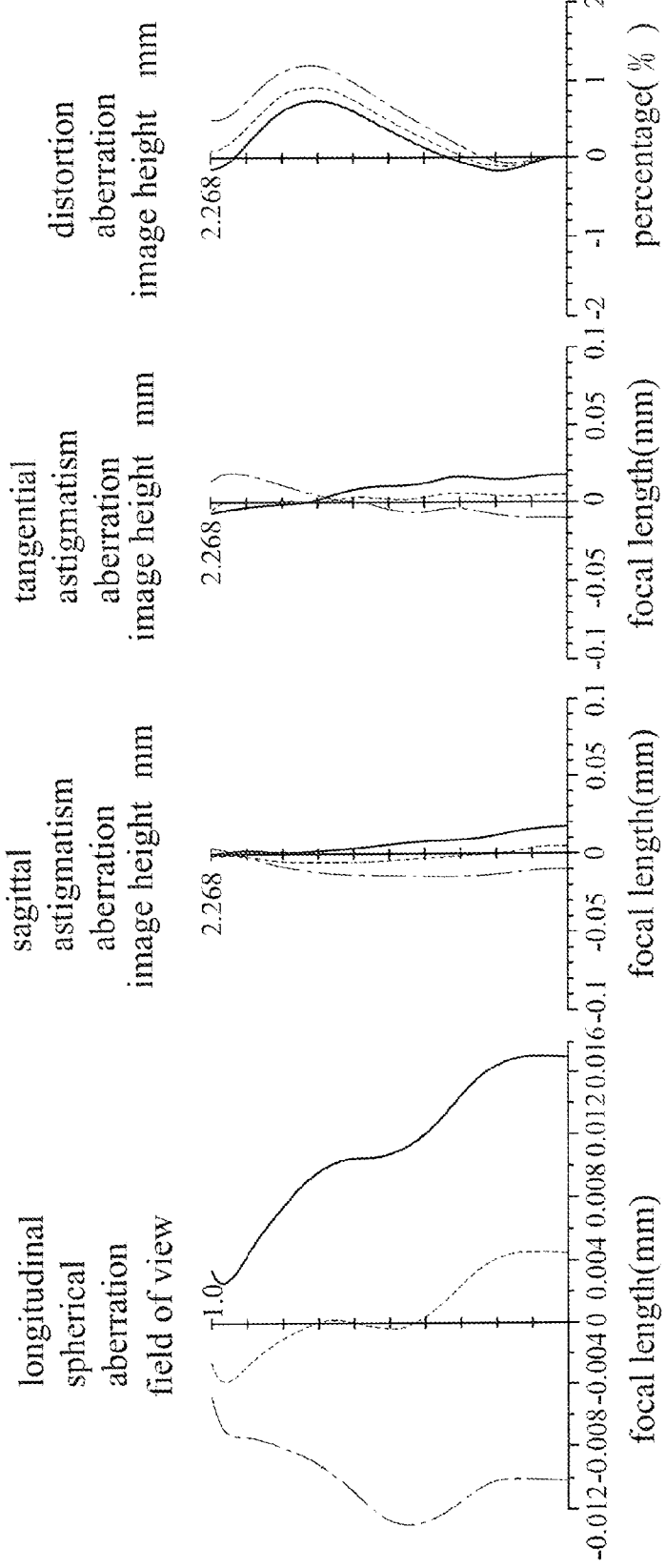
FIGS. 29(a) to 29(d) show different optical characteristics of the imaging lens of the seventh preferred embodiment.

FIG. 26 illustrates a seventh preferred embodiment of an imaging lens 10 according to the present invention, which has a configuration similar to that of the first preferred embodiment and differs in that: the object-side surface 51 of the fourth lens element 6 has a concave portion 611 in a vicinity on the optical axis (I), and a convex portion 614 in a vicinity of the periphery of the fourth lens element 6. The image-side surface 62 of the fourth lens element 6 has a convex portion 621 in a vicinity of the optical axis (I), and a concave portion 623 in a vicinity of the periphery of the fourth lens element 6. It should be noted herein that, in order to clearly illustrate the seventh preferred embodiment, reference numerals of the convex and concave portions that are the same as those of the first preferred embodiment have been omitted in FIG. 26.

Shown in FIG. 27 is a table that lists values of some optical data corresponding to the surfaces 31-81, 32-82 of the seventh preferred embodiment. The imaging lens 10 has an overall system focal length of 2.679 mm, an HFOV of 40.015°, an F-number of 2.058, and a system length of 4.084 mm.

Shown in FIG. 28 is a table that lists values of some aspherical coefficients of the aforementioned relationship (1) corresponding to the seventh preferred embodiment.

Relationships among some of the aforementioned lens parameters corresponding to the seventh preferred embodiment are shown in FIGS. 42 and 43.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Figure 30:
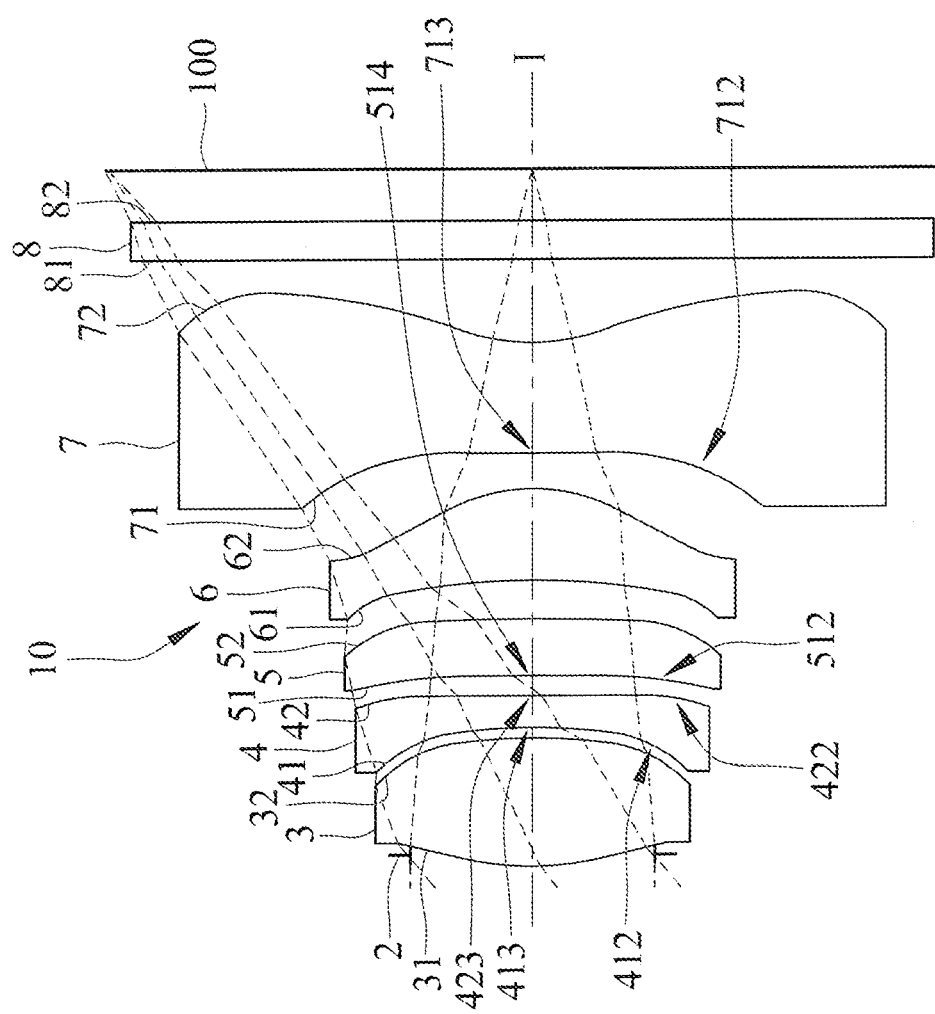
FIG. 30 is a schematic diagram that illustrates the eighth preferred embodiment of an imaging lens according to the present invention.
Figure 33:
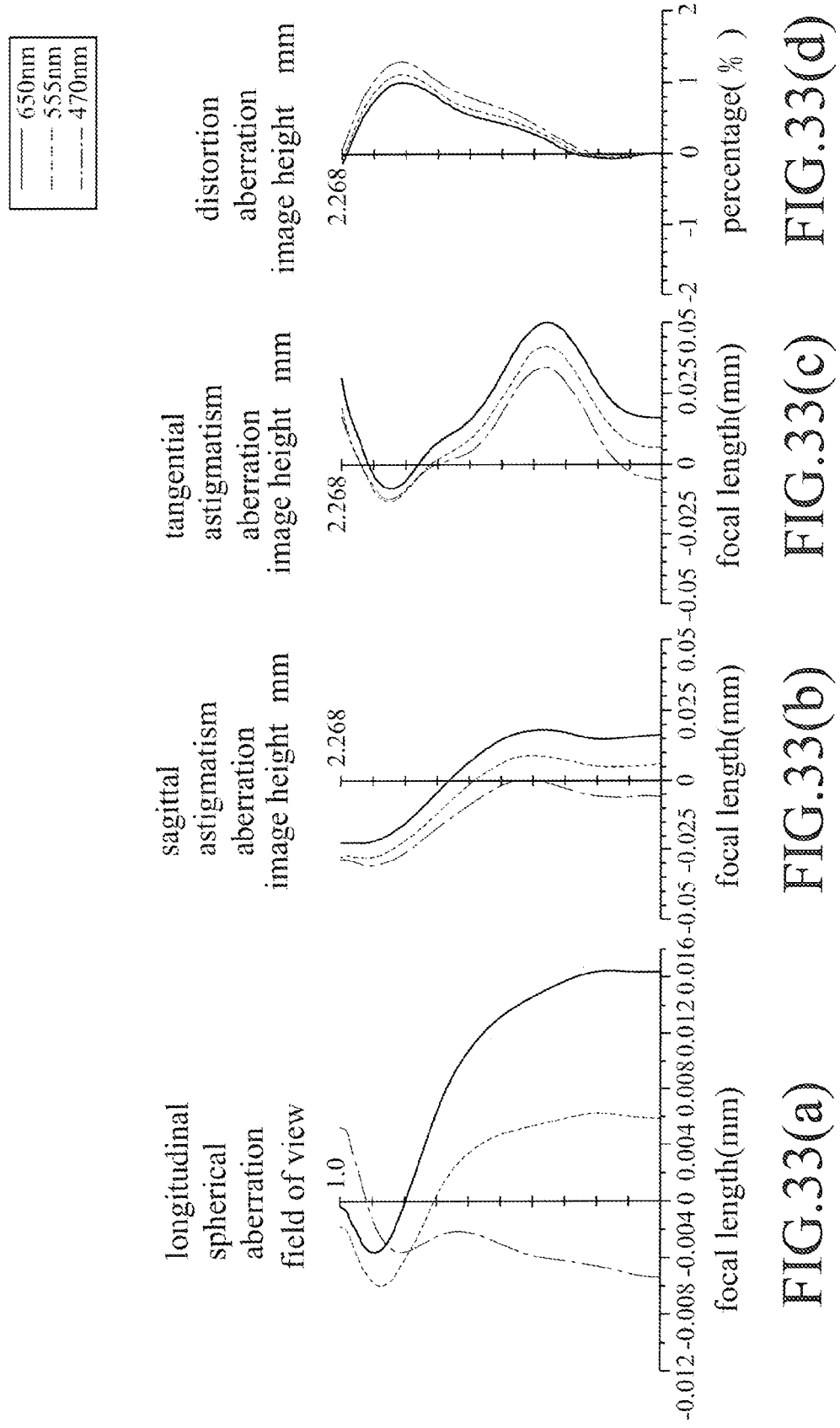
FIGS. 33(a) to 33(d) show different optical characteristics of the imaging lens of the eighth preferred embodiment.

FIG. 30 illustrates an eighth preferred embodiment of en imaging lens 10 according to the present invention, which has a configuration similar to that of the first preferred embodiment and differs in that: the object-side surface 41 of the second lens element 4 is a concave surface that has a concave portion 4 13 in a vicinity of the optical axis (I), and a concave portion 412 in a vicinity of the periphery of the second lens element 4. The image-side surface 42 of the second lens element 4 is a convex surface that has a convex portion 423 in a vicinity of the optical axis (I), and a convex portion 422 in a vicinity of the periphery of the second lens element 4. The object-side surface 51 of the third lens element 5 is a concave surface that has a concave portion 514 in a vicinity of the optical axis (I), and a concave portion 512 in a vicinity of the periphery of the second, lens element 5. The object-side surface 71 of the fifth lens element 7 is a concave surface that has a concave portion 713 in a vicinity of the optical axis (I), and a concave portion 715 in a vicinity of the periphery of the fifth lens element 7. It should be noted herein that, in order to clearly illustrate the eighth preferred embodiment, reference numerals of the convex and concave portions that are the same as those of the first preferred embodiment have been omit ted in FIG. 30.

Shown in FIG. 31 is a table that lists values of some optical data corresponding to the surfaces 31-81, 32-82 of the eighth preferred embodiment. The imaging lens 10 has an overall system focal length of 2.682 mm, an HFOV of 40.002°, an F-number of 2.078, and a system length of 3.753 mm.

Shown in FIG. 32 is a table that lists values of some aspherical coefficients of the aforementioned relationship (1) corresponding to the eighth preferred embodiment.

Relationships among some of the aforementioned lens parameters corresponding to the eighth preferred embodiment are shown in FIGS. 42 and 43.

FIGS. 33(a) to 33(d) respectively show simulation results corresponding to longitudinal spherical aberration, sagittal astigmatism aberration, tangential astigmatism aberration, and distortion aberration of the eighth preferred embodiment. It can be understood from FIGS. 33(a) to 33(d) that the eighth preferred embodiment is able to achieve a relatively good optical performance.

Figure 34:
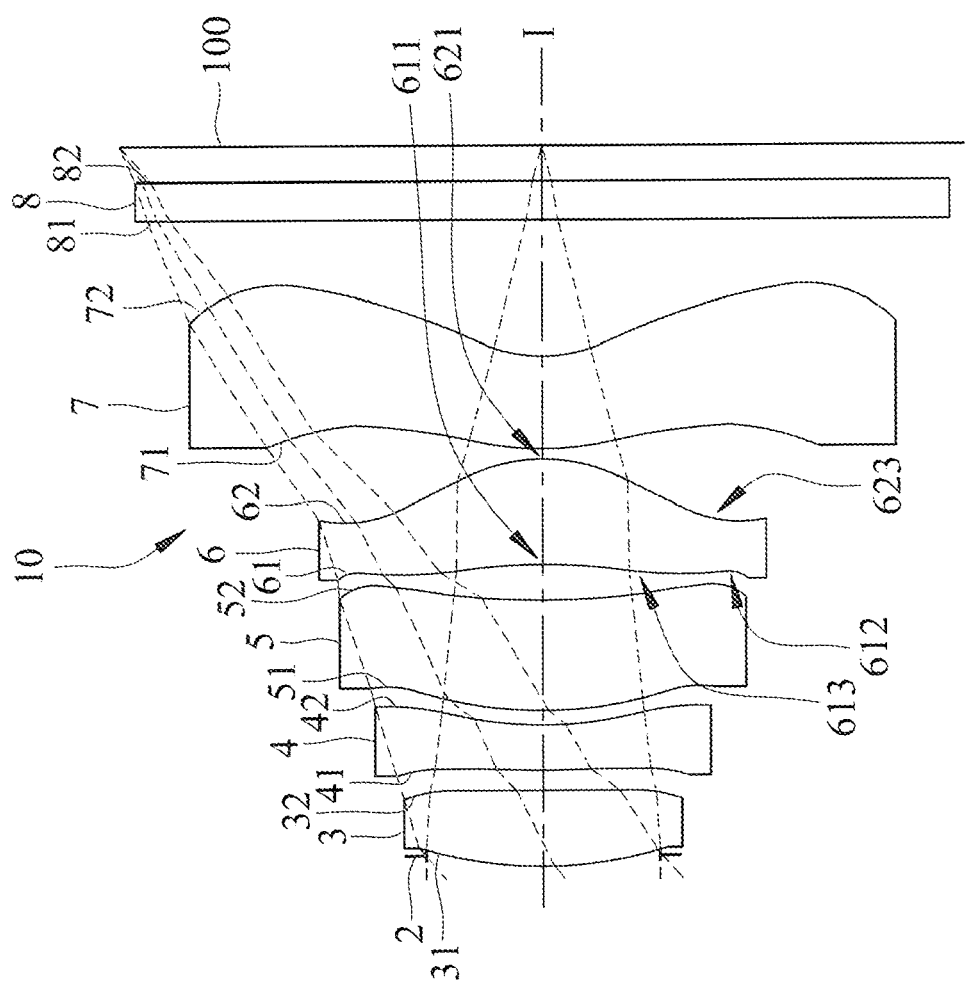
FIG. 34 is a schematic diagram that illustrates the ninth preferred embodiment of an imaging lens according to the present invention.

FIG. 34 illustrates a ninth preferred embodiment of an imaging lens 10 according to the present invention, which has a configuration similar to that of the sixth preferred embodiment where: the object-side surface 61 of the fourth lens element 6 has a concave portion 611 in a vicinity of the optical axis (I), a concave portion 612 in a vicinity of the periphery of the fourth lens element 6, and a convex portion 613 disposed between the concave portions 611, 612; and the image-side surface 62 of the fourth lens element 6 has a convex portion 621 in a vicinity of the optical axis (I), and a concave portion 623 in a vicinity of the periphery of the fourth lens element 6. The imaging lens 10 differs in modifications of some optical data, aspherical coefficients and lens parameters of the lens elements 3-17. It should ne noted herein that, in order to clearly illustrate the ninth preferred embodiment, reference numerals of the convex and concave portions that are the same as those of the first preferred embodiment have been omitted in FIG. 34.

Shown in FIG. 35 is a table that lists values of some optical data corresponding to the surfaces 31-81, 32-82 of the ninth preferred embodiment. The imaging lens 10 has an overall system focal length of 2.608 mm, an HFOV of 40.701°, an F-number of 2.052, and a system length of 3.927 mm.

Shown in FIG. 36 is a table that lists values of some aspherical coefficients of the aforementioned relationship (1) corresponding to the ninth preferred embodiment.

Relationships among some of the aforementioned lens parameters corresponding to the ninth preferred embodiment are shown in FIGS. 42 and 43.

Figure 37:
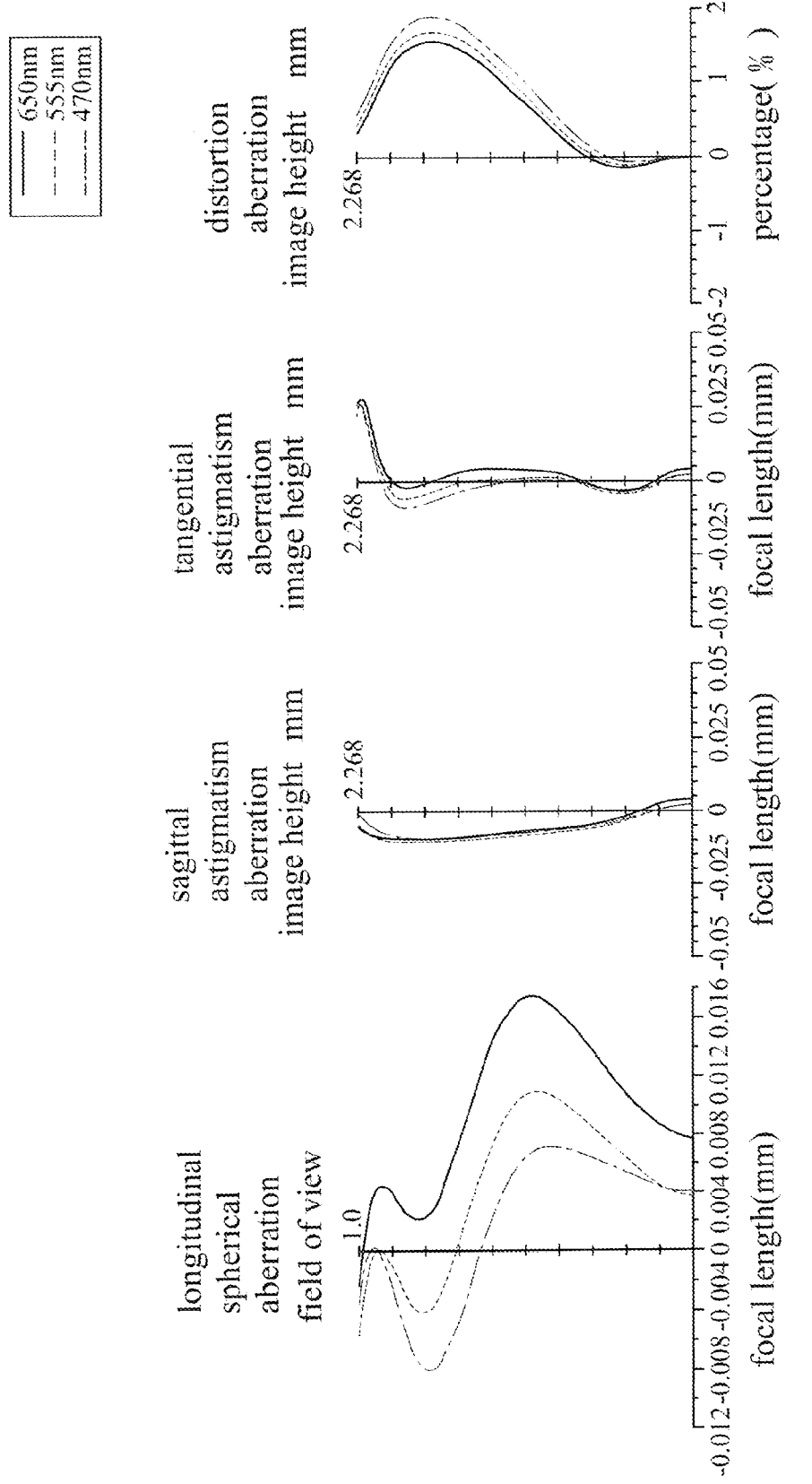
FIGS. 37(a) to 37(d) show different optical characteristics of the imaging lens of the ninth preferred embodiment.

FIGS. 37(a) to 37(a) respectively show simulation results corresponding to longitudinal spherical aberration, sagittal astigmatism aberration, tangential, astigmatism aberration, and distortion aberration of the ninth preferred embodiment. It can be understood from FIGS. 37(a) to 37(d) that the ninth preferred embodiment is able to achieve a relatively good optical performance.

Figure 38:
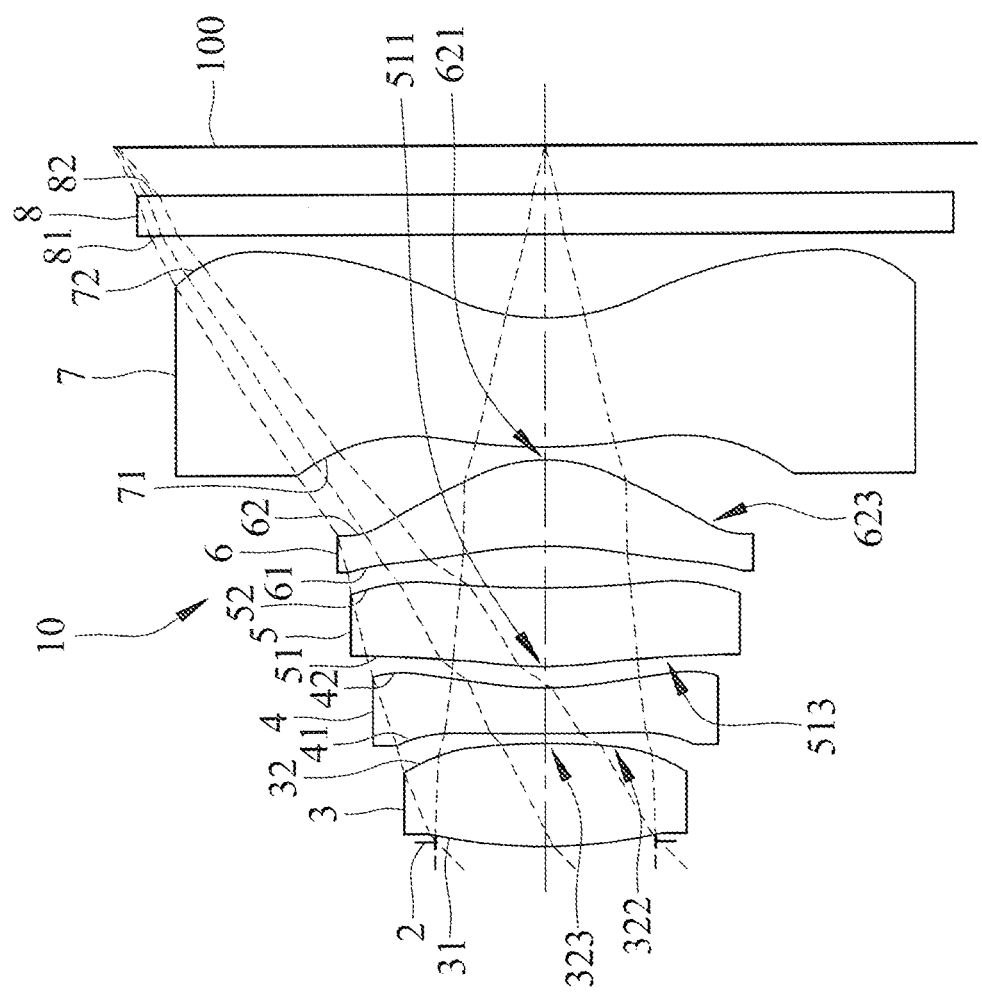
FIG. 38 is a schematic diagram that illustrates the tenth preferred embodiment of an imaging lens according to the present invention.
Figures 41A, 41B, 41C, 41D:
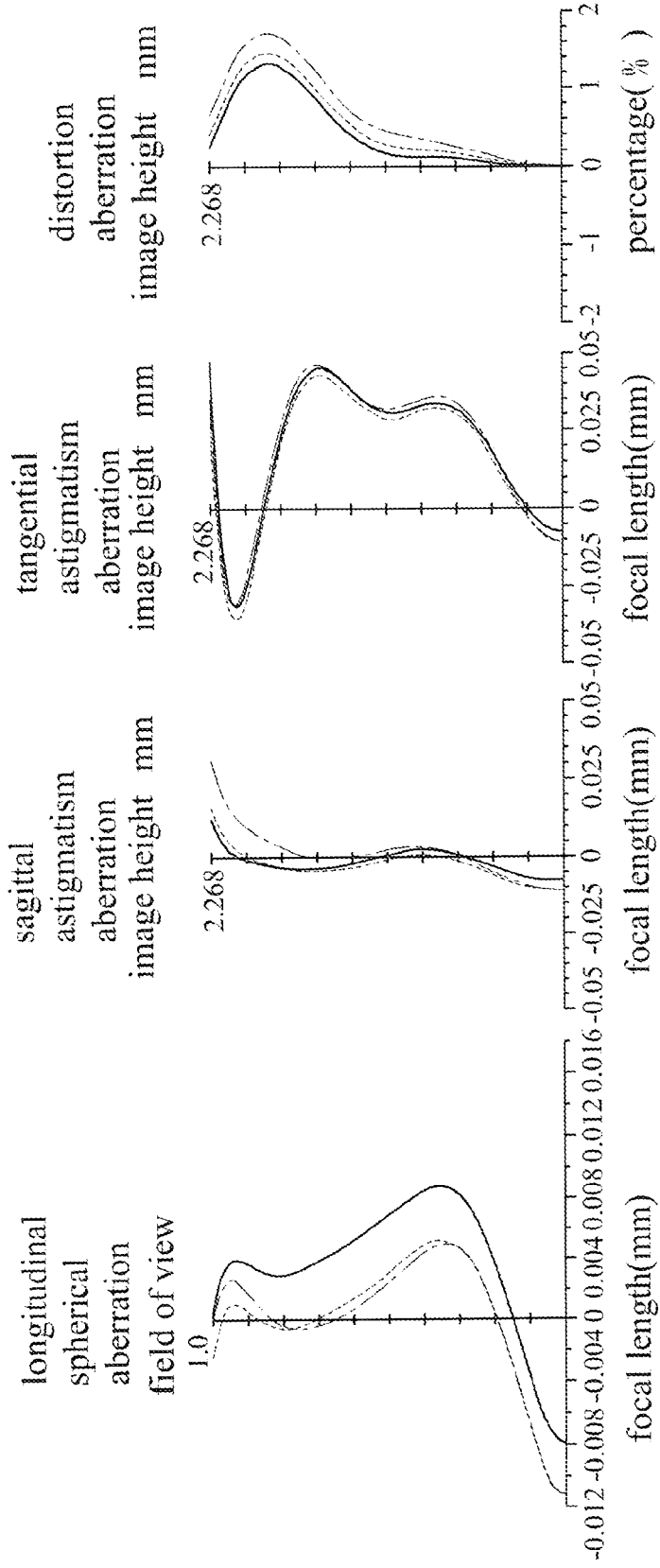
FIGS. 41(a) to 41(d) show different optical characteristics of the imaging lens of the tenth preferred embodiment.

FIG. 3B illustrates a tenth preferred embodiment of an imaging lens 10 according to the present invention, which has a configuration similar to that of the first preferred embodiment and differs in that: the image-side surface 32 of the first lens element 3 is a convex surface that has a convex portion 323 in a vicinity of the optical axis (I), and a convex portion 322 in a vicinity of the periphery of the first lens element 3. The object-side surface 51 of the third lens element 5 is a convex surface that has a convex portion 511 in a vicinity of the optical axis (I), and a convex portion 513 in a vicinity of the periphery of the third lens element 5. The image-side surface 62 of the fourth lens element 6 has a convex portion 621 in a vicinity of the optical axis (I), and a concave portion 623 in a vicinity of the periphery of the fourth lens element 6. It should be noted herein that, in order to clearly illustrate the tenth preferred embodiment, reference numerals of the convex and concave portions that are the same as those of the first preferred embodiment have been omitted in FIG. 38.

Shown in FIG. 39 is a table that lists values of seine optical data corresponding to the surfaces 31-81, 32-82 of the tenth preferred embodiment. The imaging lens 10 has an overall system focal length of 2.392 mm, an HFOV of 42.991°, an F-number of 2.092, and a system length of 3.720 mm.

Shown in FIG. 40 is a table chat lists values of some aspherical coefficients of the aforementioned relationship (1) corresponding to the tenth prefer red embodiment.

Figure 45:
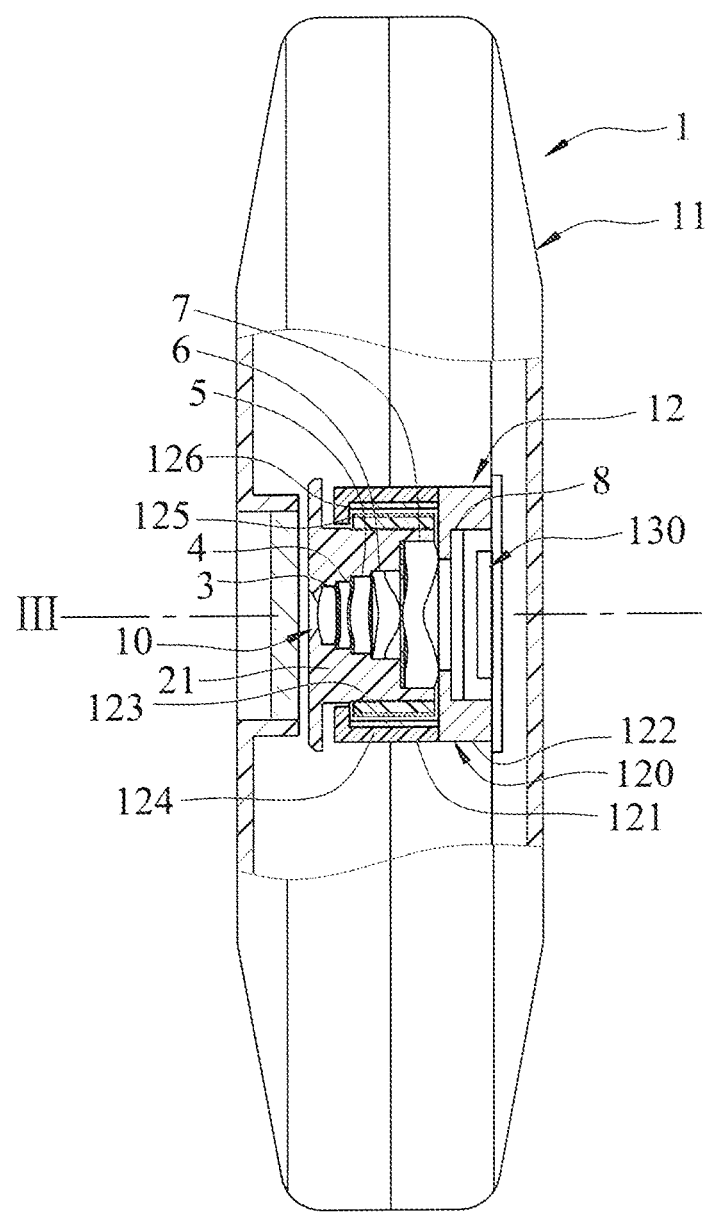
FIG. 45 is a schematic partly sectional view to illustrate a second exemplary application of the imaging lens of the present invention.

Relationships among some of the aforementioned lens parameters corresponding to the tenth preferred embodiment are shown in FIGS. 45 and 43.

FIGS. 41(a) to 41(d) respectively show simulation results corresponding to longitudinal spherical aberration, sagittal astigmatism aberration, tangential astigmatism aberration, and distortion aberration of the tenth preferred embodiment. It can be understood from FIGS. 41(a) to 41(d) that the tenth preferred embodiment is able to achieve a relatively good optical performance.

Shown in FIGS. 42 and 43 are tables that list, the aforesaid relationships among some of the aforementioned lens parameters corresponding to the ten preferred embodiments for comparison. When the lens parameters of the imaging lens 10 according to this invention satisfy the following relationships, the optical per forma nee is still relatively good even with the reduced system length:

(1) $T2/G34 \leq 14$, $T4/G34 \leq 8.1$ and $T1/G34 \leq 5$: Reduction of G34 is limited due to the image-side surface 52 of the third lens element 5 having the concave portion 521 in the vicinity of the optical axis (I), and the object-side surface 61 of the fourth lens element 6 having the concave portion 611 in the vicinity of the optical axis (I). Thus, $T2/G34$, $T4/G34$ and $T1/G34$ should be designed to have relatively snail values. Preferably, $0.2 \leq T2/G34 \leq 4.00$, $1 \leq T4/G34 \leq 8.10$ and $0.7 \leq T1/G34 \leq 5.00$.

(2) $T1/(G12+G23+G45) \geq 1.6$, $ALT/(G12+G23+G45) \geq 6.9$ and $T5/(G12+G23+G45) \geq 1.7$: G12 can be reduced due to the image-side surface 32 of the first lens element 3 having the convex portion 322 in a vicinity of the periphery of the first lens element 3, and the edges of the first and second lens elements 3, 4 do not easily interfere with each other. G23 can be reduced due to the image-side surface 42 of the second lens element 4 having the convex portion 422 in a vicinity of the periphery of the second lens element 4, and the edges of one second and third lens element 4, 5 do not easily interfere with each other. G45 is less limited and can be shorter due to the image-side surface 62 of the fourth lens element 6 and the object-side surface 71 of the fifth lens element 7 having no restrictions in surface shape/structure. Thus, (G12+G23+G45) should be designed to be small such that as a result, $T1/(G12+G23+G45)$, $ALT/(G12+G23+G45)$ and $T5/(G12+G23+G45)$ tend to be large. Preferably, $1.6023 \leq T1/(G12+G23+G45) \leq 3.00$, $6.90 \leq ALT/(G12+G23+G45) \leq 12.00$ and $1.70 \leq T5/(G12+G23+G45) \leq 3.20$.

(3) $Gaa/T3 \leq 1.95$, $Gaa/(G12+G23+G45) \leq 2.4$ and $Gaa/T2 \geq 2.32$: As mentioned above, the designs of G12, G23 and G45 should be small. Thus, the overall design of Gaa is reduced accordingly and $Gaa/T3$, $Gaa/(G12+G23+G45)$ and $Gaa/T2$ tend to be small. Preferably, $0.30 \leq Gaa/T3 \leq 1.95$, $0.70 \leq Gaa/(G12+G23+G45) \leq 2.40$ and $1.00 \leq Gaa/T2 \leq 2.32$.

(4) $T4/T3 \geq 1.35$, $ALT/T5 \leq 5.70$, $T1/T3 \geq 1.20$, $T3/T2 \geq 1.19$, $EFL/T2 \geq 9.10$ and $EFL/(G12+G23+G45) \leq 12.10$: Due to the rising demand in image quality and the shorter length of the imaging lens 10, the surface contours of each of the lens elements in a vicinity of the optical ails (I) and in a vicinity of the periphery of the respective lens element may vary in consideration of the optical path. Taking the property of light into consideration, it should be noted that, light entering the imaging lens 10 from edges requires a greater angle of refraction when traveling through the imaging lens 10 so as to be focused with the light entering the imaging lens 10 around the optical axis (I) on the image plane 100. Therefore, the thickness of and the air gap length between each of the lens elements must cooperate with one another to achieve good image quality of the imaging lens 10. In addition, the focal length is associated with the length of the imaging lens 10, the thicknesses of the lens elements 3-7 and the lengths of the air gaps, so that when these conditions are satisfied, the imaging lens 10 may have an optimal configuration. Preferably, $1.35 \leq T4/T3 \leq 3.0$ $3.0 \leq ALT/T5 \leq 5.70$, $1.20 \leq T1/T3 \leq 2.80$, $1.19 \leq T3/T2 \leq 3.20$, $9.10 \leq EFL/T2 \leq 16.00$ and $3.00 \leq EEL/(G12+G23+G45) \leq 12.10$.

To sum up, effects and advantages of the imaging lens 10 according to the present invention are described hereinafter.

1) By the provision of the convex portion 322, the converging ability of the imaging lens 10 may be enhanced. By positioning the aperture stop 2 at the object side of the first lens element 3, the length of the imaging lens 10 may be shortened. Moreover, since the fifth lens element 7 is made or a plastic material, the weight and cost of the imaging lens 10 are reduced.

2) Configurations of the convex portions 322, 422, 522 and the concave portions 521, 611, 721 aid in aberration correction, which enhances the image quality of the imaging lens 10. When the image-side surface 42 of the second lens element 4 has the concave portion 421 in a vicinity of the optical axis (I), or the object-side surface 51 of the third lens element 5 has the convex portion 511 in a vicinity of the optical axis (I), the optical aberration correcting capability is improved.

3) Through design of the relevant optical parameters, optical aberrations, such as spherical aberration, may be reduced or even eliminated. Further, through surface design and arrangement of the lens elements 3-7, even with the system length reduced, optical aberrations may still be reduced or even eliminated, resulting in relatively good optical performance.

4) Through the aforesaid ten preferred embodiments, it is known that the length of this invention may be reduced down to below 4.5 nm while maintaining good optical performance.

Figure 44:
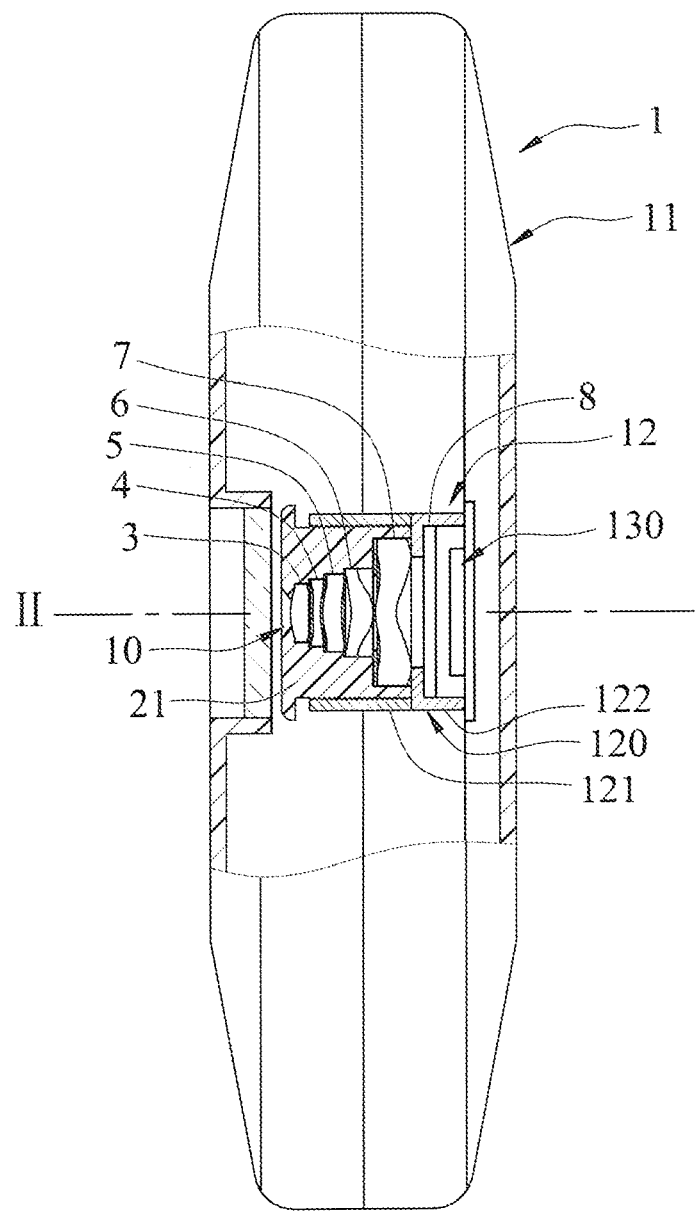
FIG. 44 is a schematic partly sectional view to illustrate a first exemplary application of the imaging lens of the present invention.

Shown in FIG. 44 is a first exemplary application of the imaging lens 10, in which the imaging lens 10 is disposed in a housing 11 of an electronic apparatus 1 (such as a mobile phone, but not limited thereto), and forms a par t of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portico 122 having a portion interposed between the first holder portion 121 and the image sensor 130. The barrel 21 and the first holder portion 121 of the holder unit 120 extend along an axis (II), which coincides with the optical awls (I) of the imaging lens 10.

Shown in FIG. 40 is a second exemplary application of the imaging lens 10. The differences between tune first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between tine inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said image-side surface of said first lens element has a convex portion in a vicinity of a periphery of said first lens element;

said image-side surface of said second lens element has a convex portion in a vicinity of a periphery of said second lens element;

said image-side surface of said third lens element has a concave portion in a vicinity of the optical axis, and a convex portion in a vicinity of a periphery of said third lens element;

said object-side surface of said fourth lens element has a concave portion in a vicinity of the optical axis;

said image-side surface of said fifth lens element has a concave portion in a vicinity of the optical axis, and said fifth lens element is made of a plastic material;

said imaging lens does not include any lens element with refractive power other than said first lens element, said second lens element, said third lens element, said fourth lens element and said fifth lens element;

said imaging lens satisfies $Gaa/T3 \leq 1.95$, where Gaa represents a sum of air gap lengths among said first lens element, said second lens element, said third lens element, said fourth lens element and said fifth lens element at the optical axis, and T3 represents a thickness of said third lens element at the optical axis; and said imaging lens further satisfies $T1/T3 \geq 1.2$, where T1 represents the thickness of said first lens element at the optical axis.

2. The imaging lens as claimed in claim 1, further satisfying $T2/G34 \leq 4$, where G34 represents the air gap length between said third lens element and said fourth lens element at the optical axis, and T2 represents a thickness of said second lens element at the optical axis.

3. The imaging lens as claimed in claim 2, wherein said image-side surface of said second lens element has a concave portion in a vicinity of the optical axis.

4. The imaging lens as claimed in claim 3, further satisfying $T4/T3 \geq 1.35$, where T4 represents a thickness of said fourth lens element at the optical axis.

5. The imaging lens as claimed in claim 1, further satisfying $T4/G34 \leq 8.1$, where T4 represents a thickness of said fourth lens element at the optical axis, and G34 represents the air gap length between said third lens element and said fourth lens element at the optical axis.

6. The imaging lens as claimed in claim 5, wherein said object-side surface of said third lens element has a convex portion in a vicinity of the optical axis.

7. The imaging lens as claimed in claim 6, further satisfying $Gaa/T2 \leq 2.32$, where T2 represents a thickness of said second lens element at the optical axis.

8. The imaging lens as claimed in claim 1, further satisfying $T1/G34 \leq 5$, where G34 represents the air gap length between said third lens element and said fourth lens element at the optical axis, wherein the second lens element has a negative refractive power.

9. The imaging lens as claimed in claim 8, further satisfying $Gaa/(G12+G23+G45) \leq 2.4$, where G12 represents the air gap length between said first lens element and said second lens element at the optical axis, G23 represents the air gap length between said second lens element and said third lens element at the optical axis, and G45 represents the air gap length between said fourth lens element and said fifth lens element at the optical axis.

10. The imaging lens as claimed in claim 9, further satisfying $T1/(G12+G23+G45) \geq 1.6$.

11. The imaging lens as claimed in claim 1, further satisfying $EFL/(G12+G23+G45) \leq 12.1$, where EFL represents a system focal length of said imaging lens, G12 represents the air gap length between said first lens element and said second lens element at the optical axis, G23 represents the air gap length between said second lens element and said third lens element at the optical axis, and G45 represents the air gap length between said fourth lens element and said fifth lens element at the optical axis.

12. The imaging lens as claimed in claim 11, further satisfying $T5/(G12+G23+G45) \geq 1.7$, where T5 represents a thickness of said fifth lens element at the optical axis.

13. The imaging lens as claimed in claim 1, further satisfying $ALT/T5 \leq 5.7$ where ALT represents a sum of thicknesses of said first, second, third, fourth and fifth lens elements at the optical axis, and T5 represents the thickness of said fifth lens element at the optical axis.

14. The imaging lens as claimed in Claim 13, further satisfying $T3/T2 \geq 1.19$, where T2 represents the thickness of said second lens element at the optical axis.

15. The imaging lens as claimed in claim 1, further satisfying $EFL/T2 \geq 9.1$, where EFL represents a system focal length of said imaging lens, and T2 represents a thickness of said second lens element at the optical axis.

16. The imaging lens as claimed in claim 15, further satisfying $ALT/(G12+G23+G45) \geq 6.9$, where ALT represents a sum of thicknesses of said first, second, third, fourth and fifth lens elements at the optical axis, G12 represents the air gap length between said first lens element and said second lens element at the optical axis, G23 represents the air gap length between said second lens element and said third lens element at the optical axis, and G45 represents the air gap length between said fourth lens element and said fifth lens element at the optical axis.

17. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *